US010225308B1

(12) United States Patent
Lu

(10) Patent No.: US 10,225,308 B1
(45) Date of Patent: Mar. 5, 2019

(54) DECREMENTAL Z-SCORE CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 263 days.

(21) Appl. No.: 14/981,070

(22) Filed: Dec. 28, 2015

Related U.S. Application Data

(60) Provisional application No. 62/115,156, filed on Feb. 12, 2015.

(51) Int. Cl.
*H04L 29/06* (2006.01)
(52) U.S. Cl.
CPC .................................. *H04L 65/604* (2013.01)
(58) Field of Classification Search
CPC ...................................................... H04L 65/604
See application file for complete search history.

(56) References Cited

U.S. PATENT DOCUMENTS

| 7,747,413 | B2 | 6/2010 | Ramsey et al. |
| 7,840,377 | B2 | 11/2010 | Ramsey et al. |
| 9,069,726 | B2 | 6/2015 | Lu |
| 2013/0110761 | A1* | 5/2013 | Viswanathan ....... G06N 99/005 706/52 |
| 2014/0164456 | A1 | 6/2014 | Lu |
| 2015/0154619 | A1* | 6/2015 | Grichnik ............ G06Q 30/0202 705/7.31 |
| 2015/0261963 | A1* | 9/2015 | Ukil ........................ H04L 63/04 726/26 |
| 2016/0022168 | A1* | 1/2016 | Luczak .............. A61N 1/36139 600/544 |

FOREIGN PATENT DOCUMENTS

| WO | WO-2014093540 A2 | 6/2014 |
| WO | WO-2014093540 A3 | 9/2014 |

OTHER PUBLICATIONS

Wikipedia, "Standard score", Feb. 11, 2015, 4 Pages.*
PCT, International Preliminary Report on Patentability, dated Jun. 16, 2015, 6 Pages.*

* cited by examiner

*Primary Examiner* — Arvin Eskandarnia
*Assistant Examiner* — Chhian (Amy) Ling

(57) ABSTRACT

The present invention extends to methods, systems, and computing system program products for decrementally calculating Z-score for Big Data or streamed data. Embodiments of the invention include decrementally calculating one or more components of a Z-score for a modified computation subset based on one or more components of a Z-score calculated for a pre-modified computation subset and then calculating a Z-score for a selected data element in the modified computation subset based on one or more of the decrementally calculated components. Decrementally calculating Z-score avoids visiting all data elements in the modified computation subset and performing redundant computations thereby increasing calculation efficiency, saving computing resources and reducing computing system's power consumption.

20 Claims, 26 Drawing Sheets

The Definition of a Z-score:

Define the sum of the computation subset $X$ with size $n$ in the $k^{th}$ iteration as below:

$$S_k = x_1 + x_2 + x_3 + \cdots + x_n = \sum_1^n x_i \qquad \text{401}$$

Define the mean of the computation subset $X$ with size $n$ in the $k^{th}$ iteration as below:

$$\bar{x}_k = \frac{(x_1 + x_2 + x_3 + \cdots + x_n)}{n} = \frac{\sum_1^n x_i}{n} \qquad \text{402}$$

The Z-score of a selected data element $x_m$ ($1 \leq m \leq n$) in the computation subset $X$ with size $n$ in the $k^{th}$ iteration is defined as:

$$Z_k(x_m) = \frac{x_m - \bar{x}_k}{\sqrt[2]{\frac{1}{n}\sum_1^n (x_i - \bar{x}_k)^2}} \qquad \text{403}$$

Define the sum of the modified computation subset $X$ with size $n-1$ in the $k+1^{th}$ iteration as below:

$$S_{k+1} = x_1 + x_2 + x_3 + \cdots + x_n - x_r = \sum_1^n x_i - x_r \qquad \text{404}$$

Define the mean of the modified computation subset $X$ with size $n-1$ in the $k+1^{th}$ iteration as below:

$$\bar{x}_{k+1} = \frac{(x_1 + x_2 + x_3 + \cdots + x_n - x_r)}{n-1} = \frac{\sum_1^n x_i - x_r}{n-1} \qquad \text{405}$$

The Z-score of a selected data element $x_m$ ($1 \leq m \leq n$) in the modified computation subset $X$ with size $n-1$ in the $k+1^{th}$ iteration is defined as:

$$Z_{k+1}(x_m) = \frac{x_m - \bar{x}_{k+1}}{\sqrt[2]{\frac{1}{n-1}(\sum_1^n (x_i - \bar{x}_{k+1})^2 - (x_r - \bar{x}_{k+1})^2)}} \qquad \text{406}$$

Fig. 4A

Some Example Components of a Z-score:

A component of a Z-score is a quantity or expression appearing in a Z-score's definition equation or any transforms of the definition equation.

The following are a few example components of a Z-score:

- $S_k = \sum_1^n x_i$
- $\bar{x}_k = \frac{1}{n}\sum_1^n x_i$
- $SS_k = \sum_1^n x_i^2$
- $SSD_k = \sum_1^n (x_i - \bar{x}_k)^2$
- $vp_k = \frac{1}{n}\sum_1^n (x_i - \bar{x}_k)^2$
- $\sigma_k = \sqrt{\frac{1}{n}\sum_1^n (x_i - \bar{x}_k)^2}$
- $Z_k(x_m) = \frac{x_m - \bar{x}_k}{\sigma_k} = \frac{x_m - \bar{x}_k}{\sqrt[2]{\frac{1}{n}\sum_1^n (x_i - \bar{x}_k)^2}}$ The sum and/or mean of the data elements in the data set may be used by following example decremental algorithms, so the equations for calculating them are put here instead of in each decremental algorithms.

$S_{k+1}$ defined in equation 404 can be calculated in a decremental way by using $S_k$ defined in equation 401:

$S_{k+1} = S_k - x_r$ ⌒⌣407

$\bar{x}_{k+1}$ defined in equation 405 can be calculated in a decremental way by using $\bar{x}_k$ defined in equation 402:

$\bar{x}_{k+1} = \frac{(n\bar{x}_k - x_r)}{n-1}$ ⌒⌣408

Fig. 4B

Decremental Algorithm 1:

Population variance $vp_k = \frac{1}{n}\sum_1^n(x_i - \bar{x}_k)^2$ is a component of Z-score. Population variance can be decrementally calculated based on the population variance calculated on the old computation subset and components $S_k$ or $\bar{x}_k$ and $S_{k+1}$ or $\bar{x}_{k+1}$ defined in Figure 4A.

$$vp_k = \frac{1}{n}\sum_1^n(x_i - \bar{x}_k)^2 \qquad \sim\!\!\_\,409$$

$$vp_{k+1} = \frac{1}{n}(\sum_1^n(x_i - \bar{x}_{k+1})^2 - (x_r - \bar{x}_{k+1})^2) \qquad \sim\!\!\_\,410$$

$$vp_{k+1} = \frac{n \times vp_k - (x_r - S_{k+1}/(n-1))(x_r - S_k/n)}{n-1} = \frac{n \times vp_k - (x_r - \bar{x}_{k+1})(x_r - \bar{x}_k)}{n-1} \qquad \sim\!\!\_\,411$$

Once population variance $vp_k$ is calculated, then Z-score of a selected data element $x_m$ in the $k^{th}$ iteration can be calculated by $$Z_k(x_m) = \frac{x_m - S_k/n}{\sqrt[2]{vp_k}} = \frac{x_m - \bar{x}_k}{\sqrt[2]{vp_k}} \qquad \sim\!\!\_\,412$$

Once population variance $vp_{k+1}$ is calculated, then Z-score of a selected data element $x_m$ in the $k+1^{th}$ iteration can be calculated by $$Z_{k+1}(x_m) = \frac{x_m - S_{k+1}/(n-1)}{\sqrt[2]{vp_{k+1}}} = \frac{x_m - \bar{x}_{k+1}}{\sqrt[2]{vp_{k+1}}} \qquad \sim\!\!\_\,413$$

Fig. 4C

Decremental Algorithm 2:

$\sum_{1}^{n}(x_i - \bar{x}_k)^2$ is a component of a Z-score. $\sum_{1}^{n}(x_i - \bar{x}_k)^2$ can be decrementally calculated based on another component $S_{k+1}$ or $\bar{x}_{k+1}$ defined earlier.

$SSD_k = \sum_{1}^{n}(x_i - \bar{x}_k)^2$ ⌢⌣414

$SSD_{k+1} = \sum_{1}^{n}(x_i - \bar{x}_{k+1})^2 - (x_r - \bar{x}_{k+1})^2$ ⌢⌣415

$SSD_{k+1}$ can be decrementally calculated using components $S_k$ or $\bar{x}_k$ and $S_{k+1}$ or $\bar{x}_{k+1}$:

$SSD_{k+1} = SSD_k - (x_r - S_{k+1}/(n-1))(x_r - S_k/n) = SSD_k - (x_r - \bar{x}_{k+1})(x_r - \bar{x}_k)$ ⌢⌣416

Once $SSD_k$ is calculated, Z-score of a selected data element $x_m$ in the k$^{th}$ iteration can be calculated by $Z_k(x_m) = \frac{n \cdot x_m - S_k}{\sqrt[2]{n \cdot SSD_k}} = \frac{x_m - \bar{x}_k}{2\sqrt{\frac{SSD_k}{n}}}$ ⌢⌣417

Once $SSD_{k+1}$ is calculated, Z-score of a selected data element $x_m$ in the k+1$^{th}$ iteration can be calculated by $Z_{k+1}(x_m) = \frac{(n-1) \cdot x_m - S_k}{\sqrt[2]{(n-1) \cdot SSD_k}} = \frac{x_m - \bar{x}_{k+1}}{2\sqrt{\frac{SSD_{k+1}}{n-1}}}$ ⌢⌣418

Fig. 4D

Decremental Algorithm 3:

A Z-score can be decrementally calculated based on component $S_{k+1}$ or $\bar{x}_{k+1}$ defined in Figure 4A and component $SS_{k+1}$ defined below.

$$SS_k = \sum_1^n x_i^2 \qquad \frown\!\!\smile 419$$

$$SS_{k+1} = \sum_1^n x_i^2 - x_r^2 \qquad \frown\!\!\smile 420$$

$SS_{k+1}$ can be calculated in a decremental way:

$$SS_{k+1} = SS_k - x_r^2 \qquad \frown\!\!\smile 421$$

Once $S_k$ or $\bar{x}_k$ and $SS_k$ are calculated, Z-score of a selected data element $x_m$ in the $k^{th}$ iteration can be calculated by $$Z_k(x_m) = \frac{x_m - \bar{x}_k}{\sqrt[2]{\frac{SS_k}{n} - (S_k/n)^2}} = \frac{x_m - \bar{x}_k}{\sqrt[2]{\frac{SS_k - \bar{x}_k S_k}{n}}} = \frac{x_m - \bar{x}_k}{\sqrt[2]{\frac{SS_k}{n} - \bar{x}_k^2}} \qquad \frown\!\!\smile 422$$

Once $S_{k+1}$ or $\bar{x}_{k+1}$ and $SS_{k+1}$ are calculated, Z-score of a selected data element $x_m$ in the $k+1^{th}$ iteration can be calculated by $$Z_{k+1}(x_m) = \frac{(n-1)x_m - S_{k+1}}{\sqrt[2]{(n-1)SS_{k+1} - S_{k+1}^2}} = \frac{x_m - \bar{x}_{k+1}}{\sqrt[2]{\frac{SS_{k+1} - \bar{x}_{k+1} S_{k+1}}{n-1}}} = \frac{x_m - \bar{x}_{k+1}}{\sqrt[2]{\frac{SS_{k+1}}{n-1} - \bar{x}_{k+1}^2}} \qquad \frown\!\!\smile 423$$

Fig. 4E

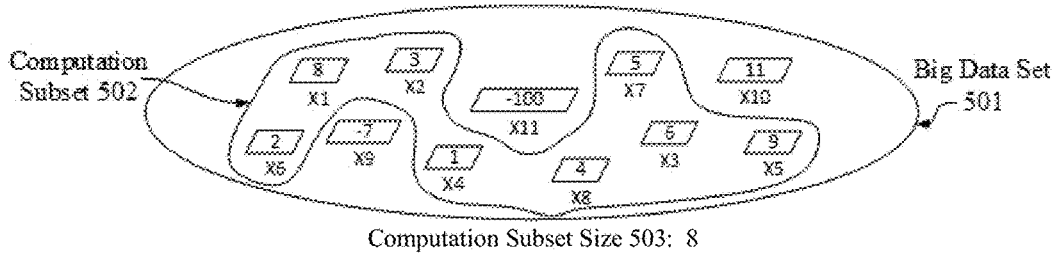

Computation Subset Size 503: 8

Calculate Z-score for Computation Subset 502

Traditional Algorithm:

1. Calculate $\bar{x}_1$ of computation subset 502 for the 1st iteration:

$$\bar{x}_1 = \frac{8+3+6+1+9+2+5+4}{8} = \frac{38}{8} = 4.75$$

Operations in this step: 1 division, 7 additions

2. Calculate $\frac{1}{8}\sum_{1}^{8}(x_i - \bar{x}_1)^2$ for the 1st iteration:

$$\frac{1}{8}\sum_{1}^{8}(x_i - \bar{x}_1)^2 = \frac{1}{8}((8-4.75)^2 + (3-4.75)^2 + (6-4.75)^2 + (1-4.75)^2 + (9-4.75)^2 +$$
$$(2-4.75)^2 + (5-4.75)^2 + (4-4.75)^2) = \frac{1}{8}(10.5625 + 3.0625 + 1.5625 + 14.0625 +$$
$$18.0625 + 7.5625 + 0.0625 + 0.5625) = \frac{1}{8} \times 55.5 = 6.9375$$

Operations in this step: 1 division, 8 multiplications, 7 additions, 8 subtractions 3. Use equation 403 to calculate the Z-score of $x_8$ for the 1st iteration:

$$Z_1(x_8) = \frac{x_8 - \bar{x}_1}{\sqrt[2]{\frac{1}{8}\sum_{1}^{8}(x_i-\bar{x}_1)^2}} = \frac{4-4.75}{\sqrt[2]{6.9375}} = \frac{-0.75}{2.6339134382131847} = -0.2847473987257497$$

Operations in this step: 1 square root, 1 division, 1 subtraction

There are a total of 1 square root, 3 divisions, 8 multiplications, 14 additions and 9 subtractions.

Fig. 5A

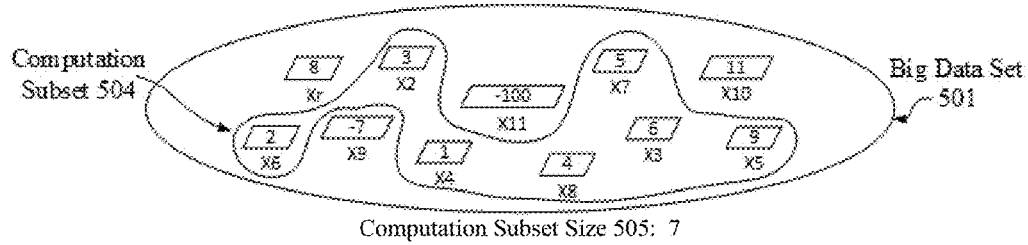

Computation Subset Size 505: 7

<u>Calculate Z-score for Computation Subset 504</u>

Traditional Algorithm:

1. Use equation 402 to calculate $\bar{x}_2$ of computation subset 504 for the 2$^{nd}$ iteration:

$$\bar{x}_2 = \frac{3+6+1+9+2+5+4}{7} = \frac{30}{7} = 4.285714285714286$$

Operations in this step: 1 division, 6 additions

2. Calculate $\frac{1}{7}(\sum_2^8(x_i - \bar{x}_2)^2)$ for the 2$^{nd}$ iteration:

$\frac{1}{7}(\sum_2^8(x_i - \bar{x}_2)^2) = \frac{1}{7}((3 - 4.285714285714286)^2 + (6 - 4.285714285714286)^2 +$
$(1 - 4.285714285714286)^2 + (9 - 4.285714285714286)^2 + (2 - 4.285714285714286)^2 +$
$(5 - 4.285714285714286)^2 + (4 - 4.285714285714286)^2) = \frac{1}{7}(1.653061224489797 +$
$2.938775510204081 + 10.79591836734694 + 22.22448979591836 + 5.224489795918369 +$
$0.5102040816326527 + 0.0816326530612247) = \frac{1}{7} \times 43.42857142857142 =$
$6.20408163265306$ Operations in this step: 1 division, 7 multiplications, 6 additions, 7 subtractions 3. Use equation 403 to calculate the Z-score of $x_8$ for the 2$^{nd}$ iteration:

$$Z_2(x_8) = \frac{x_8 - \bar{x}_2}{2\sqrt{\frac{1}{7}(\sum_2^8(x_i - \bar{x}_2)^2)}} = \frac{4 - 4.285714285714286}{2\sqrt{6.20408163265306}} = \frac{-0.285714285714286}{2.4907993963089561} = -0.114707866935281$$

Operations in this step: 1 square root, 1 division, 1 subtraction

There are also a total of 1 square root, 3 divisions, 8 multiplications, 14 additions and 8 subtractions.

Fig. 5A Cont'd 1

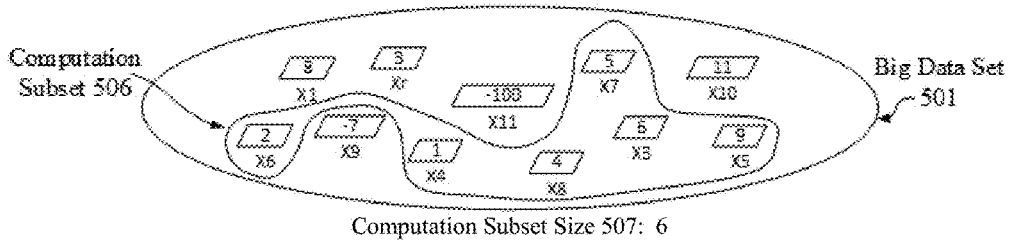

Computation Subset Size 507: 6

Calculate Z-score for Computation Subset 506

Traditional Algorithm:

1. Use equation 402 to calculate $\bar{x}_3$ of computation subset 506 for the 3$^{rd}$ iteration:

$$\bar{x}_3 = \frac{6+1+9+2+5+4}{6} = \frac{27}{6} = 4.5$$

Operations in this step: 1 division, 5 additions

2. Calculate $\frac{1}{6}(\sum_{3}^{8}(x_i - \bar{x}_3)^2)$ for the 3$^{rd}$ iteration:

$$\frac{1}{6}(\sum_{3}^{8}(x_i - \bar{x}_3)^2) = \frac{1}{6}((6 - 4.5)^2 + (1 - 4.5)^2 + (9 - 4.5)^2 + (2 - 4.5)^2 + (5 - 4.5)^2 +$$
$$(4 - 4.5)^2) = \frac{1}{5}(2.25 + 12.25 + 20.25 + 6.25 + 0.25 + 0.25) = \frac{1}{6} \times 41.5 = 6.9166666666666667$$

Operations in this step: 1 division, 6 multiplications, 5 additions, 6 subtractions 3. Use equation 403 to calculate the Z-score of $x_8$ for the 3$^{rd}$ iteration:

$$Z_3(x_8) = \frac{x_8 - \bar{x}_3}{\sqrt[2]{\frac{1}{6}(\sum_{3}^{8}(x_i - \bar{x}_3)^2)}} = \frac{4-4.5}{\sqrt[2]{6.9166666666666667}} = \frac{-0.5}{2.6299556396765833} = -0.1901172751573434$$

Operations in this step: 1 square root, 1 division, 1 subtraction

There are also a total of 1 square root, 3 divisions, 6 multiplications, 10 additions and 7 subtractions.

Generally for a computation subset with size $n$, there are a total of 1 square root, 3 divisions, $n$ multiplications, $2(n-1)$ additions and $(n+1)$ subtractions when calculating a Z-score using traditional algorithms without optimization.

Fig. 5A Cont'd 2

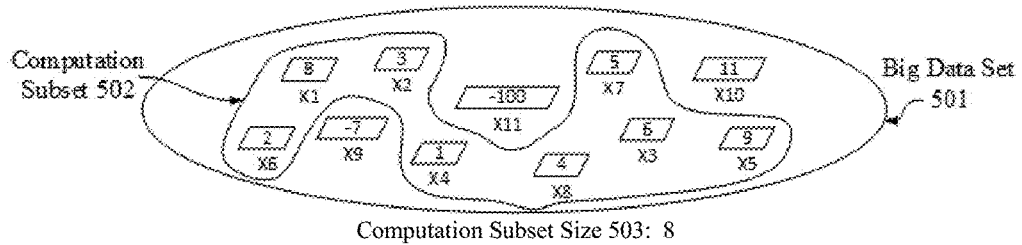

Computation Subset Size 503: 8

Calculate Z-score for Computation Subset 502

Decremental Algorithm 1:

1. Use equation 402 to initially calculate $\bar{x}_1$ of computation subset 502 for the 1st iteration:

$$\bar{x}_1 = \frac{8+3+6+1+9+2+5+4}{8} = \frac{38}{8} = 4.75$$

Operations in this step: 1 division, 7 additions

2. Use equation 409 to initially calculate $vp_1 = \frac{1}{8}\sum_1^8(x_i - \bar{x}_1)^2$ for the 1st iteration:

$$vp_1 = \frac{1}{8}\sum_1^8(x_i - \bar{x}_1)^2 = \frac{1}{8}((8-4.75)^2 + (3-4.75)^2 + (6-4.75)^2 + (1-4.75)^2 + (9-4.75)^2 +$$
$$(2-4.75)^2 + (5-4.75)^2 + (4-4.75)^2) = \frac{1}{8}(10.5625 + 3.0625 + 1.5625 + 14.0625 +$$
$$18.0625 + 7.5625 + 0.0625 + 0.5625) = \frac{1}{8} \times 55.5 = 6.9375$$

Operations in this step: 1 division, 8 multiplications, 7 additions, 8 subtractions 3. Use equation 412 to initially calculate the Z-score of $x_8$ for the 1st iteration:

$$Z_1(x_8) = \frac{x_8 - \bar{x}_1}{\sqrt{vp_1}} = \frac{4-4.75}{\sqrt{6.9375}} = \frac{-0.75}{2.6339134382131847} = -0.2847473987257497$$

Operations in this step: 1 square root, 1 division, 1 subtraction

There are a total of 1 square root, 3 divisions, 8 multiplications, 14 additions and 9 subtractions.

Fig. 5B

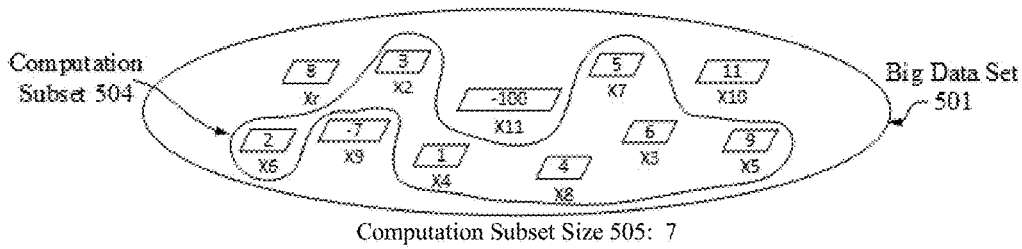

Computation Subset Size 505: 7

Calculate Z-score for Computation Subset 504

Decremental Algorithm 1:

1. Calculate 8-1 and keep its result

Operations in this step: 1 subtraction

2. Use equation 408 to directly decrementally calculate $\bar{x}_2$ for the $2^{nd}$ iteration:

$$\bar{x}_2 = \frac{(8\bar{x}_1 - x_r)}{8-1} = \frac{8 \times 4.75 - 8}{7} = 4.285714285714286$$

Operations in this step: 1 division, 1 multiplication, 1 subtraction (using 8-1 calculated in step 1)

3. Use equation 411 to directly decrementally calculate $vp_2$ for the $2^{nd}$ iteration:

$$vp_2 = \frac{8vp_1 - (x_r - \bar{x}_2)(x_r - \bar{x}_1)}{8-1} = \frac{8 \times 6.9375 - (8 - 4.285714285714286)(8-4.75)}{7} = \frac{55.5 - 3.714285714285714 \times 3.25}{7} =$$
$$\frac{55.5 - 12.0714285714285705}{7} = \frac{43.4285714285714295}{7} = 6.2040816326530614$$

Operations in this step: 1 division, 1 multiplication, 3 subtractions (using 8-1 calculated in step 1)

4. Use equation 413 to indirectly decrementally calculate the Z-score of $x_8$ for the $2^{nd}$ iteration:

$$Z_2(x_8) = \frac{x_8 - \bar{x}_2}{\sqrt[2]{vp_2}} = \frac{4 - 4.285714285714286}{\sqrt[2]{6.2040816326530614}} = \frac{-0.285714285714286}{2.4907993963089564}$$
$$= -0.114707866935281$$

Operations in this step: 1 square root, 1 division, 1 subtraction

There are a total of 1 square root, 3 divisions, 2 multiplications, 6 subtractions.

Fig. 5B Cont'd 1

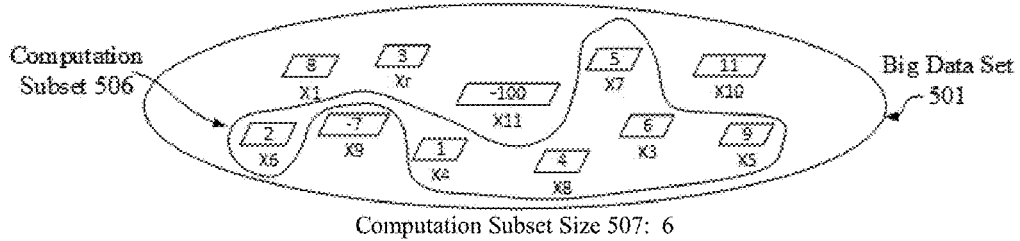

Computation Subset Size 507: 6

Calculate Z-score for Computation Subset 506

Decremental Algorithm 1:

1. Calculate 7-1 and keep its result

Operations in this step: 1 subtraction

2. Use equation 408 to directly decrementally calculate $\bar{x}_3$ of computation subset 506 for the 3$^{rd}$ iteration:

$$\bar{x}_3 = \frac{(7\bar{x}_2 - 3)}{7-1} = \frac{7 \times 4.285714285714286 - 3}{6} = \frac{27}{6} = 4.5$$

Operations in this step: 1 division, 1 multiplication, 1 subtraction (using 7-1 calculated in step 1)

3. Use equation 411 to directly decrementally calculate $vp_3$ for the 3$^{rd}$ iteration:

$$vp_3 = \frac{7vp_2 - (x_r - \bar{x}_3)(x_r - \bar{x}_2)}{7-1} = \frac{7 \times 6.2040816326530614 - (3 - 4.5) \times (3 - 4.285714285714286)}{6} =$$
$$\frac{43.4285714285714298 - 1.928571428571429}{6} = \frac{41.5000000000000008}{6} = 6.9166666666666668$$

Operations in this step: 1 division, 1 multiplication, 3 subtractions (using 7-1 calculated in step 1)

4. Use equation 413 to indirectly decrementally calculate the Z-score of $x_8$ for the 3$^{rd}$ iteration:

$$Z_3(x_8) = \frac{x_8 - \bar{x}_3}{\sqrt[2]{vp_3}} = \frac{4 - 4.5}{\sqrt[2]{6.9166666666666668}} = \frac{-0.5}{2.6299556396765834} = -0.1901172751573434$$

Operations in this step: 1 square root, 1 division, 1 subtraction

There are also a total of 1 square root, 3 divisions, 2 multiplications, and 6 subtractions.

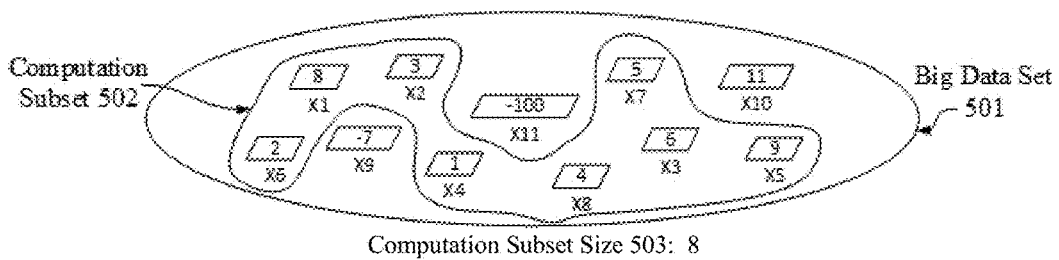

Computation Subset Size 503: 8

Calculate Z-score for Computation Subset 502

Decremental Algorithm 2:

1. Use equation 402 to initially calculate $\bar{x}_1$ of computation subset 502 for the 1st iteration:

$$\bar{x}_1 = \frac{8+3+6+1+9+2+5+4}{8} = \frac{38}{8} = 4.75$$

Operations in this step: 1 division, 7 additions

2. Use equation 414 to initially calculate $SSD_1 = \sum_1^8 (x_i - \bar{x}_1)^2$ for the 1st iteration:

$SSD_1 = \sum_1^8 (x_i - \bar{x}_1)^2 = ((8 - 4.75)^2 + (3 - 4.75)^2 + (6 - 4.75)^2 + (1 - 4.75)^2 + (9 - 4.75)^2 + (2 - 4.75)^2 + (5 - 4.75)^2 + (4 - 4.75)^2) = (10.5625 + 3.0625 + 1.5625 + 14.0625 + 18.0625 + 7.5625 + 0.0625 + 0.5625) = 55.5$ Operations in this step: 8 multiplications, 7 additions, 8 subtractions 3. Use equation 417 to initially calculate the Z-score of $x_8$ for the 1st iteration:

$$Z_1(x_8) = \frac{x_8 - \bar{x}_1}{2\sqrt{\frac{SSD_1}{n}}} = \frac{4 - 4.75}{2\sqrt{\frac{55.5}{8}}} = \frac{-0.75}{2\sqrt{6.9375}} = \frac{-0.75}{2.6339134382131847} = -0.2847473987257497$$

Operations in this step: 1 square root, 2 divisions, 1 subtraction

There are a total of 1 square root, 3 divisions, 8 multiplications, 14 additions and 9 subtractions.

Fig. 5C

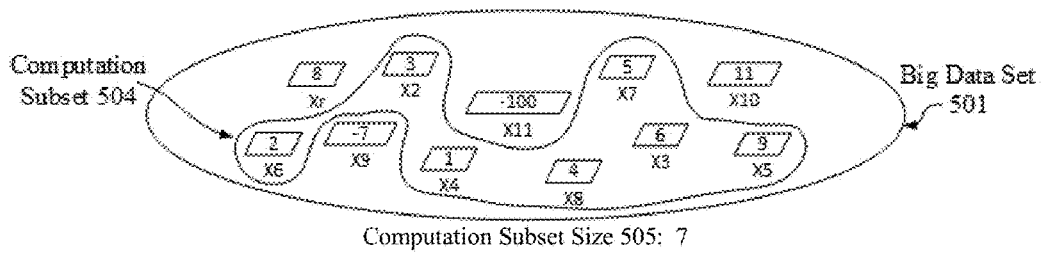

Computation Subset Size 505: 7

Calculate Z-score for Computation Subset 504

Decremental Algorithm 2:

1. Calculate 8-1 and keep its result

Operations in this step: 1 subtraction

2. Use equation 408 to directly decrementally calculate $\bar{x}_2$ of computation subset 504 for the 2$^{nd}$ iteration:

$$\bar{x}_2 = \frac{(8\bar{x}_1 - x_r)}{8-1} = \frac{8 \times 4.75 - 8}{7} = 4.285714285714286$$

Operations in this step: 1 division, 1 multiplication, 1 subtraction (using 8-1 calculated in step 1)

3. Use equation 416 to directly decrementally calculate $SSD_2$ for the 2$^{nd}$ iteration:

$$SSD_2 = SSD_1 - (x_r - \bar{x}_2)(x_r - \bar{x}_1) = 55.5 - (8 - 4.285714285714286)(8 - 4.75)$$
$$= 43.42857142857143$$

Operations in this step: 1 multiplication, 3 subtractions

4. Use equation 418 to indirectly decrementally calculate the Z-score of $x_8$ for the 2$^{nd}$ iteration:

$$Z_2(x_8) = \frac{x_8 - \bar{x}_2}{\sqrt{\frac{SSD_2}{8-1}}} = \frac{4 - 4.285714285714286}{\sqrt{\frac{43.42857142857143}{7}}} = \frac{-0.285714285714286}{\sqrt{6.2040816326530614}} = \frac{-0.285714285714286}{2.4907993963089564} = 0.114707866935281$$

Operations in this step: 1 square root, 2 divisions, 1 subtraction (using 8-1 calculated in step 1)

There are a total of 1 square root, 3 divisions, 2 multiplications and 6 subtractions.

Fig. 5C Cont'd 1

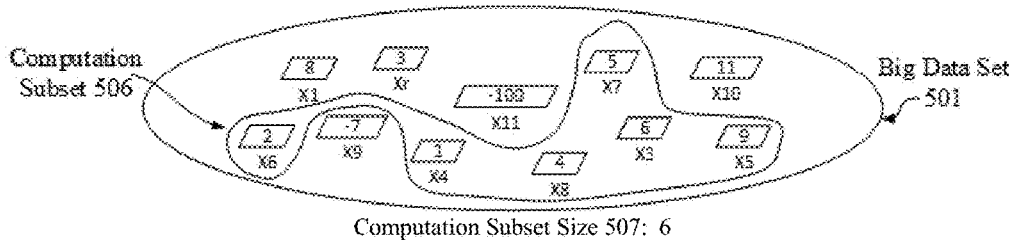

Computation Subset Size 507: 6

<u>Calculate Z-score for Computation Subset 506</u>

Decremental Algorithm 2:

1. Calculate 7-1 and keep its result

Operations in this step: 1 subtraction

2. Use equation 408 to directly decrementally calculate $\bar{x}_3$ of computation subset 506 for the 3$^{rd}$ iteration:

$$\bar{x}_3 = \frac{(7\bar{x}_2 - x_r)}{7-1} = \frac{7 \times 4.285714285714286 - 3}{6} = 4.5$$

Operations in this step: 1 division, 1 multiplication, 1 subtraction (using 7-1 calculated in step 1)

3. Use equation 416 to directly decrementally calculate $SSD_3$ for the 3$^{rd}$ iteration:

$$SSD_3 = SSD_2 - (x_r - \bar{x}_3)(x_r - \bar{x}_2)$$
$$= 43.42857142857143 - (3 - 4.5) \times (3 - 4.285714285714286) = 41.5$$

Operations in this step: 1 multiplication, 3 subtractions

4. Use equation 418 to indirectly decrementally calculate the Z-score of $x_8$ for the 3$^{rd}$ iteration:

$$Z_3(x_8) = \frac{x_8 - \bar{x}_3}{2\sqrt{\frac{SSD_3}{7-1}}} = \frac{4 - 4.5}{2\sqrt{\frac{41.5}{6}}} = \frac{-0.5}{2\sqrt{6.9166666666666667}} = \frac{-0.5}{2.6299556396765833347} = -0.1901172751573434$$

Operations in this step: 1 square root, 2 divisions, 1 subtraction (using 7-1 calculated in step 1)

There are a total of 1 square root, 3 divisions, 2 multiplications and 6 subtractions.

Fig. 5C Cont'd 2

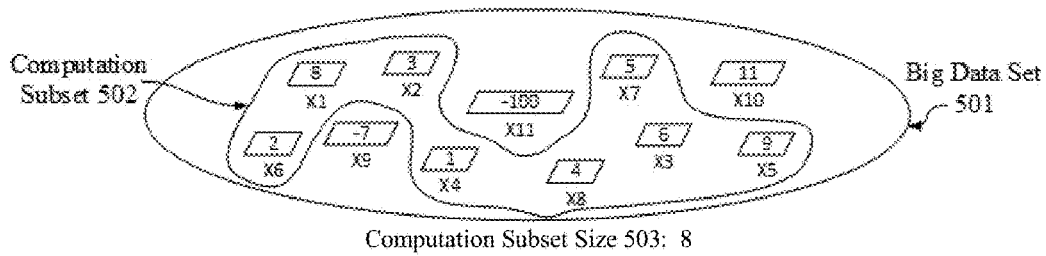

Computation Subset Size 503: 8

Calculate Z-score for Computation Subset 502

Decremental Algorithm 3:

1. Use equation 402 to initially calculate $\bar{x}_1$ of computation subset 502 for the 1$^{st}$ iteration:

$$\bar{x}_1 = \frac{8+3+6+1+9+2+5+4}{8} = \frac{38}{8} = 4.75$$

Operations in this step: 1 division, 7 additions

2. Use equation 419 to initially calculate $SS_1$ for the 1$^{st}$ iteration:

$$SS_1 = \sum_1^8 x_i^2 = 8^2 + 3^2 + 6^2 + 1^2 + 9^2 + 2^2 + 5^2 + 4^2 = 236$$

Operations in this step: 8 multiplications, 7 additions

3. Use equation 422 to initially calculate the Z-score of $x_8$ for the 1$^{st}$ iteration:

$$Z_1(x_8) = \frac{x_8 - \bar{x}_1}{2\sqrt{\frac{SS_1}{8} - \bar{x}_1^2}} = \frac{4 - 4.75}{2\sqrt{\frac{236}{8} - 4.75^2}} = \frac{-0.75}{2\sqrt{\frac{236}{8} - 4.75^2}} = \frac{-0.75}{2\sqrt{29.5 - 22.5625}} = \frac{-0.75}{2\sqrt{6.9375}} = \frac{-0.75}{2.6339134382131847} =$$
$-0.2847473987257497$ Operations in this step: 1 square root, 2 divisions, 1 multiplication, 2 subtractions There are a total of 1 square root, 3 divisions, 9 multiplications, 14 additions and 2 subtractions.

Fig. 5D

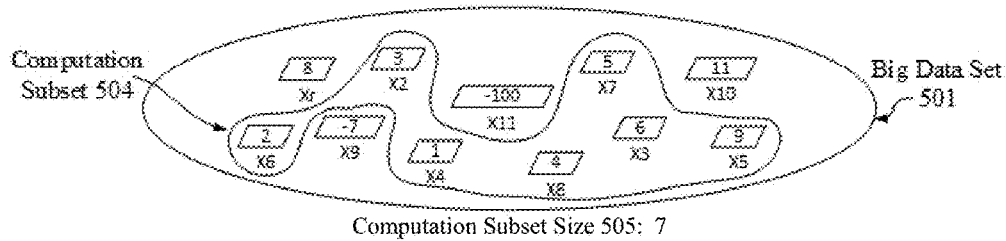

Computation Subset Size 505: 7

Calculate Z-score for Computation Subset 504

Decremental Algorithm 3:

1. Calculate 8-1 and keep its result

Operations in this step: 1 subtraction

2. Use equation 408 to directly decrementally calculate $\bar{x}_2$ of computation subset 504 for the 2$^{nd}$ iteration:

$$\bar{x}_2 = \frac{(8\bar{x}_1 - x_r)}{8-1} = \frac{8 \times 4.75 - 8}{7} = 4.285714285714286$$

Operations in this step: 1 division, 1 multiplication, 1 subtraction (using 8-1 calculated in step 1)

3. Use equation 421 to directly decrementally calculate $SS_2$ for the 2$^{nd}$ iteration:

$$SS_2 = SS_1 - x_r^2 = 236 - 64 = 172$$

Operations in this step: 1 multiplication, 1 subtraction

4. Use equation 422 to indirectly decrementally calculate the Z-score of $x_8$ for the 2$^{nd}$ iteration $$Z_2(x_8) = \frac{x_8 - \bar{x}_2}{\sqrt[2]{\frac{SS_2}{8-1} - \bar{x}_2^2}} = \frac{4 - 4.285714285714286}{\sqrt[2]{\frac{172}{7} - 4.285714285714286^2}} = \frac{-0.285714285714286}{\sqrt[2]{24.5714285714285714 - 18.3673469387755127}}$$

$$= \frac{-0.285714285714286}{\sqrt[2]{6.2040816326530587}} = \frac{-0.285714285714286}{2.4907993963089558} = -0.1147078669352\text{81}$$

Operations in this step: 1 square root, 1 division, 1 multiplication, 2 subtractions (using 8-1 calculated in step 1)

There are a total of 1 square root, 3 divisions, 3 multiplications and 5 subtractions.

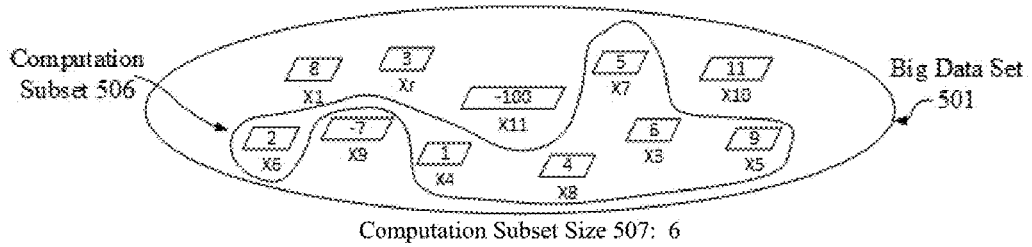

Computation Subset Size 507: 6

Calculate Z-score for Computation Subset 506

Decremental Algorithm 3:

1. Calculate 7-1 and keep its result

Operations in this step: 1 subtraction

2. Use equation 408 to directly decrementally calculate $\bar{x}_3$ of computation subset 506 for the 3$^{rd}$ iteration:

$$\bar{x}_3 = \frac{(7\bar{x}_2 - x_r)}{7-1} = \frac{7 \times 4.285714285714286 - 3}{6} = 4.5$$

Operations in this step: 1 division, 1 multiplication, 1 subtraction (using 7-1 calculated in step 1)

3. Use equation 421 to directly decrementally calculate $SS_3$ for the 3$^{rd}$ iteration:

$$SS_3 = SS_2 - x_r^2 = 172 - 3^2 = 163$$

Operations in this step: 1 multiplication, 1 subtraction

4. Use equation 423 to indirectly decrementally calculate the Z-score of $x_8$ for the 3$^{rd}$ iteration:

$$Z_3(x_8) = \frac{x_8 - \bar{x}_3}{2\sqrt{\frac{SS_3}{7-1} - \bar{x}_3^2}} = \frac{4 - 4.5}{2\sqrt{\frac{163}{6} - 4.5^2}} = \frac{-0.5}{2\sqrt{27.1666666666666667 - 20.25}} = \frac{-0.5}{2\sqrt{6.9166666666666667}} = \frac{-0.5}{2.6299556396765833} = -0.1901172751573434$$

Operations in this step: 1 square root, 2 divisions, 1 multiplication, 2 subtractions (using 7-1 calculated in step 1)

There are a total of 1 square root, 3 divisions, 3 multiplications and 5 subtractions.

Fig. 5D Cont'd 2

|  | Square Root | Division | Multiplication | Addition | Subtraction |
|---|---|---|---|---|---|
| Traditional Algorithm | 1 | 3 | 6 | 10 | 7 |
| Decremental Algorithm 1 | 1 | 3 | 2 | 0 | 6 |
| Decremental Algorithm 2 | 1 | 3 | 2 | 0 | 6 |
| Decremental Algorithm 3 | 1 | 3 | 3 | 0 | 5 |

|  | Square Root | Division | Multiplication | Addition | Subtraction |
|---|---|---|---|---|---|
| Traditional Algorithm | 1 | 3 | 1,000,000 | 1,999,998 | 1,000,001 |
| Decremental Algorithm 1 | 1 | 3 | 2 | 0 | 6 |
| Decremental Algorithm 2 | 1 | 3 | 2 | 0 | 6 |
| Decremental Algorithm 3 | 1 | 3 | 3 | 0 | 5 |

DECREMENTAL Z-SCORE CALCULATION FOR BIG DATA OR STREAMED DATA USING COMPONENTS

CROSS-REFERENCE TO RELATED APPLICATIONS

This application claims the benefit of provisional patent application Ser. No. 62/115,156, filed 2015 Feb. 12 by the present inventor.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

In addition, algorithms on streamed data processing may be extended to Big Data processing, because Big Data sets are accumulated over time and may be considered as a data stream with irregular time intervals.

Processing Big Data or streamed data may include performing calculations on multiple data elements. When performing statistical calculations on streamed data elements, the number of data elements to be accessed may be quite large. For example, when calculating a Z-score a (potentially large) number of data elements may need to be accessed.

Further, some statistical calculations are recalculated as a data element is removed from a computation subset. Thus, the (potentially large) number of data elements may be repeatedly accessed. For example, it may be that a Z-score is calculated for a computation subset whose size n keeps decreasing to exclude some out-of-date data elements. For decremental Z-score calculation algorithms, the input is not a data to be added to the computation subset but a data to be removed from the computation subset. The input must be an existing data element in the computation subset, else the decremental algorithms will not work correctly. As such, every time a data element is received, the data element is removed from the computation subset. The n−1 data elements in the computation subset are then accessed to recalculate the Z-score.

When performing a Z-score on n−1 data elements using traditional methods, all the n−1 data elements in the computation subset will be visited and used. Depending on necessity, the computation subset size n may be extremely large, so the data elements in a computation subset may be distributed over a cloud comprising hundreds of thousands of computing devices. Re-performing Z-score calculations in traditional way on a Big Data set or a data stream after some data changes inefficiently use time and computing resources.

BRIEF SUMMARY

The present disclosure describes methods, systems, and computing system program products for decrementally calculating a Z-score for Big Data or streamed data. A computing system comprises one or more computing devices. Each of the computing devices comprises one or more processors. The computing system comprises one or more storage media. The computing system has stored a data set on the one or more storage media or has access to a data stream. The computing system maintains a computation subset size counter. The computation subset size counter indicates the number of data elements in a computation subset of the data set or the data stream. Embodiments of the invention include decrementally calculating one or more components of a Z-score for a modified computation subset based on one or more components calculated for the previous computation subset and then calculating the Z-score for the modified computation subset based on one or more of the decrementally calculated components. Decrementally calculating a Z-score not only avoids visiting all the data element in the modified computation subset but also avoids storing the whole computation subset as traditional algorithms would, and thus increases calculation efficiency, saves computing resources and reduces computing devices' system's power consumption. When decrementally calculating Z-score on streamed data, the computing system may optionally include a data buffer for keeping data elements in a non-empty computation subset.

As used herein, a component of a Z-score is a quantity or expression appearing in a Z-score's definition equation or any transforms of the equation.

Before decrementally calculating a Z-score for a non-empty computation subset, a computation subset size counter and one or more components of a Z-score for the non-empty computation subset need to be initialized. The initialization of the computation subset size counter comprises setting the counter's value with the number of data elements in the computation subset or accessing or receiving a specified computation subset size. The initialization of the one or more components comprises calculating the one or more components through their definitions based on the data elements in the computation subset or accessing or receiving pre-calculated one or more components from one or more computing-device-readable media or network.

The computing system initializes a computation subset size counter and one or more ($v (1 \leq v \leq p, p \geq 1)$) components of a Z-score for a computation subset of a specified size $n (n>1)$.

The computing system accesses or receives a Big Data or streamed data element or information about (e.g., index or address of) the data element to be removed from the non-empty computation subset.

The computing system removes the accessed or received data element from an optional data buffer as needed.

The computing system modifies the computation subset by removing the accessed or received data element from the computation subset and modifies the computation subset size counter by decreasing its value by 1. The non-empty computation subset before the modification becomes a prior computation subset.

The computing system directly decrementally calculates one or more ($v(1 \le v \le p)$) components of a Z-score for the modified computation subset. Directly decrementally calculating the v components includes directly decrementally calculating each of the v components one by one. Directly decrementally calculating a component includes: accessing the component calculated or initialized for the prior computation subset and removing any contribution of the removed data element from the component mathematically.

The computing system indirectly decrementally calculating $w=p-v$ components as needed: indirectly decrementally calculating the w components includes indirectly decrementally calculating each of the w components one by one. Indirectly decrementally calculating a component includes calculating the component using components other than the component itself.

The computing system generates a Z-score for a data element selected for Z-score calculation as needed based on one or more initialized or decrementally calculated components.

The computing system may keep receiving a data element to be removed from the computation subset, removing the data element from an optional data buffer as needed, modifying the computation subset and the computation subset size, directly decrementally calculating $v(1 \le v \le p)$ components, indirectly decrementally calculating $w=p-v$ components as needed and generating a Z-score as needed, and the computing system may repeat this process for as many times as needed.

This summary is provided to introduce a selection of concepts in a simplified form that are further described below in Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and therefore are not to be considered to be limiting of its scope, the invention will be described and explained with additional specificity and detail through the use of the accompanied drawings in which:

FIG. 4A illustrates the definition of a Z-score and traditional equations for calculating them.

FIG. 4B illustrates some example components of a Z-score and a few basic decremental component calculation equations commonly used by different decremental algorithms.

FIG. 4C illustrates the first example decremental Z-score calculation algorithm (decremental algorithm 1) and its equations for decrementally calculating a Z-score based on decrementally calculated population Z-score and mean $\bar{x}_{k+1}$.

FIG. 4D illustrates the second example decremental Z-score calculation algorithm (decremental algorithm 2) and its equations for decrementally calculating a Z-score in a computation subset based on decrementally calculated $$SSD_{k+1} = \sum_{1}^{n}(x_i - \bar{x}_{k+1})^2 - (x_r - \bar{x}_{k+1})^2$$

Figure 1:
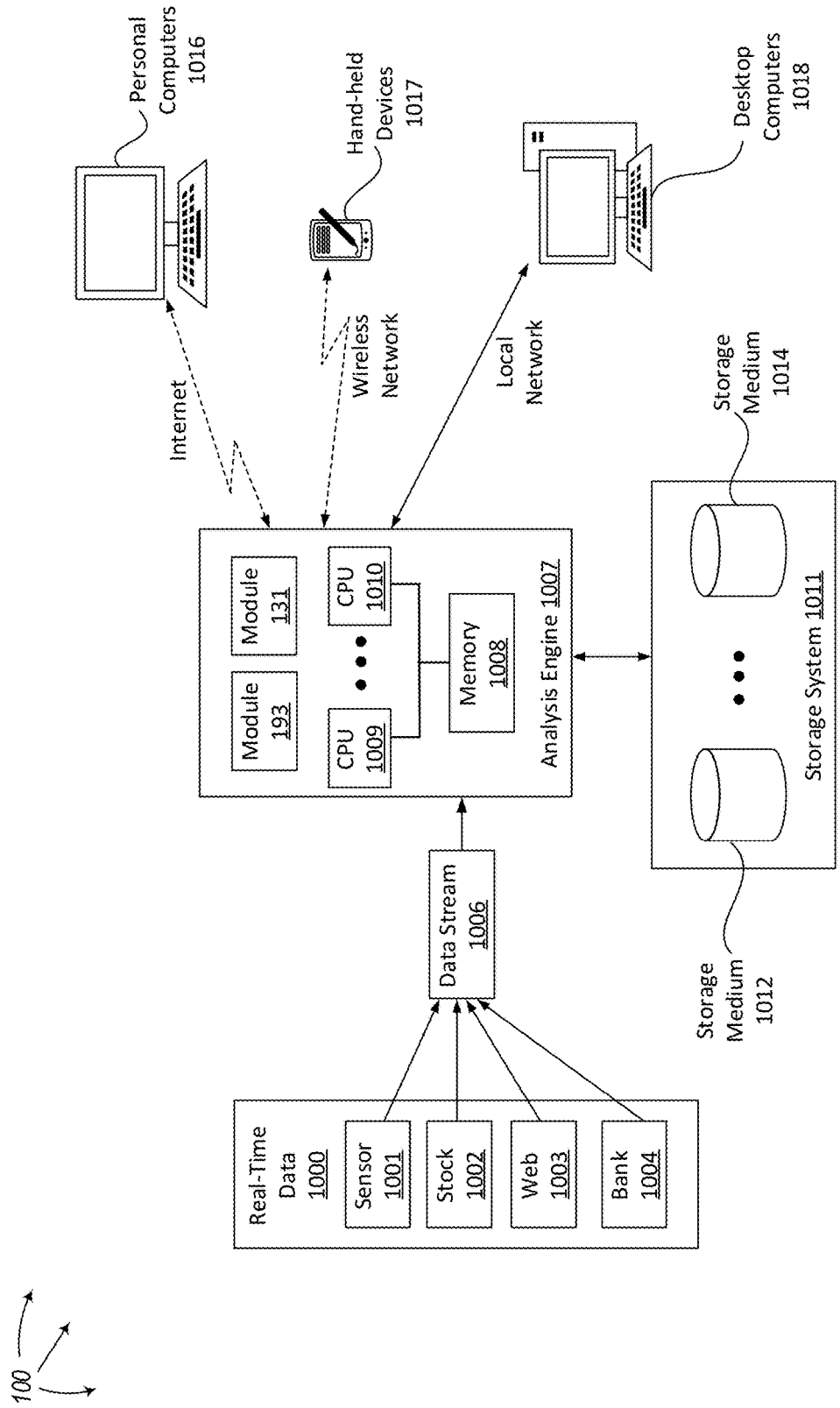
FIG. 1 illustrates a high-level overview of an example computing system that facilitates decrementally calculating Z-score for Big Data or streamed data.

and mean $\bar{x}_{k+1}$.

FIG. 4E illustrates the third example decremental Z-score calculation algorithm (decremental algorithm 3) and its equations for decrementally calculating a Z-score in a computation subset based on decrementally calculated $$SS_{k+1} = \sum_{1}^{n}x_i^2 - x_r^2$$

and mean $\bar{x}_{k+1}$.

FIG. 5A illustrates an example of calculating a Z-score using traditional algorithms as shown in FIG. 4A.

FIG. 5B illustrates an example of calculating Z-score using decremental algorithm 1 as shown in FIG. 4C.

FIG. 5C illustrates an example of calculating Z-score using decremental algorithm 2 as shown in FIG. 4D.

FIG. 5D illustrates an example of calculating Z-score using decremental algorithm 3 as shown in FIG. 4E.

FIG. 6 illustrates computational loads for traditional algorithms and decremental algorithms with a computation subset of size 6.

FIG. 7 illustrates computational loads for traditional algorithms and decremental algorithms with a computation subset of size 1,000,000.

DETAILED DESCRIPTION

The present disclosure describes methods, systems, and computing system program products for decrementally calculating a Z-score for Big Data or streamed data. A computing system comprises one or more computing devices. Each of the computing devices comprises one or more processors. The computing system comprises one or more storage media. The computing system has stored a data set on the one or more storage media or has access to a data stream. The computing system maintains a computation subset size counter. The computation subset size counter indicates the number of data elements in a computation subset of the data set or the data stream. Embodiments of the invention include decrementally calculating one or more components of a Z-score for a modified computation subset based on one or more components calculated for the previous computation subset and then calculating the Z-score for the modified computation subset based on one or more of the decrementally calculated components. Decrementally calculating a Z-score not only avoids visiting all the data element in the computation subset but also avoids storing the whole computation subset as traditional algorithms would, and thus increases calculation efficiency, saves computing resources and reduces computing system's power consumption. When decrementally calculating Z-score on streamed data, the computing system may optionally include a data buffer for keeping data elements in a non-empty computation subset.

A Z-score represents the number of standard deviation an observation or datum of a random variable is above or below the mean. A positive Z-score indicates a datum above the mean, while a negative Z-score indicate a datum below the mean.

A computation subset is a subset of a Big Data set which contains the data elements involved in a Z-score calculation. A computation subset is equivalent to a moving computation window when performing a Z-score calculation on streamed data or time series data. Within the description of embodiments of the present invention, the difference between a computation window and a computation subset is that data elements in a computation window are ordered but that in a computation subset are not.

As used herein, a component of a Z-score is a quantity or expression appearing in a Z-score's definition equation or any transforms of the equation. For example, a mean is a component of a Z-score, and a population variance is also a component of a Z-score. A Z-score comprises one or more components. A Z-score may be considered as the largest component of a Z-score itself and may be calculated based on one or more components of a Z-score. Some example components of a Z-score may be found in FIG. 4B.

A component may be either directly decrementally calculated or indirectly decrementally calculated. The difference is that when directly decrementally calculating a component, the component is calculated based on the component's value in previous iteration; when indirectly decrementally calculating a component, the component is calculated based on components other than the component itself.

For a given component, it might be directly decrementally calculated in one algorithm but indirectly decrementally calculated in another algorithm.

For a given algorithm, assume the total number of different components is $p(p\geq 1)$, the number of directly decrementally calculated components is $v(1\leq v\leq p)$, and the number of indirectly decrementally calculated components is $w=p-v(0\leq w<p)$. For any algorithm, there will be at least one component being directly decrementally calculated. It is possible that all components are directly decrementally calculated (in this case $v=p$ and $w=0$). However, directly decrementally calculated components must be calculated in every iteration no matter if a data element is selected for a Z-score calculation or not in a specific iteration.

For a given algorithm, if a component is directly decrementally calculated, then the component must be calculated in every iteration (i.e., whenever a data element is removed from the computation subset). However, if a component is indirectly decrementally calculated, then the component may be calculated as needed (i.e., when a Z-score needs to be calculated and accessed). Thus, when a Z-score is not accessed in a specific iteration and some components are indirectly decrementally calculated, only a small number of components need to be decrementally calculated. It should be understood that an indirectly decrementally calculated component may also be used in the calculation of a directly decrementally calculated component. In that case, the indirectly decrementally calculated component should also be calculated in every iteration.

Embodiments of the invention include decrementally calculating each of the one or more components of a Z-score in a modified computation subset based on the one or more components calculated for a prior computation subset.

The computing system decrementally calculates one or more $(p(p\geq 1))$ components of a Z-score starting from an existing non-empty computation subset where the computation subset size and one or more $(v(1\leq v\leq p))$ components of a Z-score have already been initialized. The initialization of the computation subset size comprises counting the number of data elements contained in the computation subset or accessing or receiving a specified computation subset size. The initialization of the one or more components comprises calculating the one or more components through their definitions based on the data elements in the computation subset or accessing or receiving pre-calculated one or more components from one or more computing-device-readable media.

The computing system accesses or receives a data element to be removed from the computation subset. The data element to be removed from the computation subset must be one of the data elements contained in the non-empty computation subset, i.e., the data element must an existing data element in the computation subset. Pure decremental Z-score calculation only needs access to the data element just accessed or received, so the computing system does not necessarily need to allocate a storage space to keep all the data elements of a computation subset but at least allocate a storage space to keep the computation subset size and one or more components of a Z-score for the computation subset.

Modifying a computation subset may be reflected by modifying the computation subset size and one or more components of a Z-score for the computation subset. However, since iterative Z-score calculation requires access to earlier received data elements, when combining decremental Z-score calculation with iterative Z-score calculation, the accessed or received data element may need to be removed from a data buffer allocated for iterative Z-score calculation. Thus, the computing system may optionally have a data buffer for keeping data elements in the computation subset and may need to remove the received data elements from the optional data buffer.

The computing system modifies the non-empty computation subset by removing the data element received from the non-empty computation subset. The computing system modifies the computation subset size counter by decreasing its value by 1. The non-empty computation subset before the modification becomes a prior computation subset.

The computing system directly decrementally calculates one or more $v(1 \le v \le p)$ components of a Z-score for the modified computation subset. Directly decrementally calculating the v components of a Z-score includes directly decrementally calculating each of the v components one by one. Directly decrementally calculating a component includes: accessing the component calculated for the prior computation subset and removing any contribution of the data element removed from the computation subset from the component mathematically.

The computing system indirectly decrementally calculates $w=p-v$ components as needed: indirectly decrementally calculating the w components includes indirectly decrementally calculating each of the w components one by one. Indirectly decrementally calculating a component includes calculating the component using components other than the component itself (Depending on a specific algorithm used, calculating each of the w components may also need to access and use the data element removed from the computation subset).

The computing system generates a Z-score as needed based on one or more decrementally calculated components.

The computing system may keep receiving a data element to be removed from the non-empty computation subset, removing the data element from a data buffer as needed, modifying the computation subset and the computation subset size, directly decrementally calculating $v(1 \le v \le p)$ components, indirectly decrementally calculating $w=p-v$ components as needed and generating a Z-score as needed, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates decrementally calculating Z-score for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, Z-score calculation module 193 and component calculation modules 131. Z-score calculation module 193 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Data from different data sources may also be stored in storage system 1011 which may be accessed for Big Data analysis. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
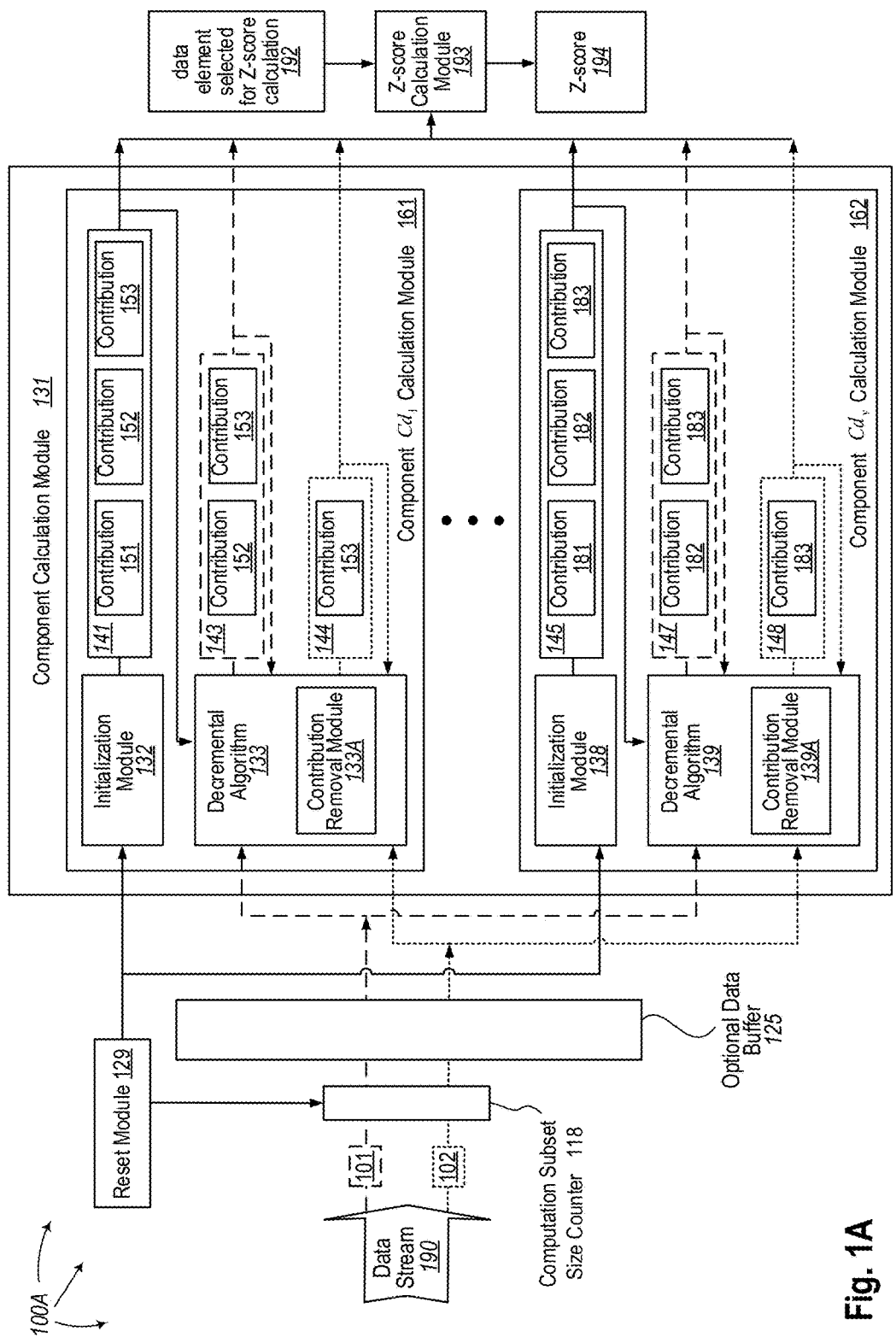
FIG. 1A illustrates an example computing system architecture that facilitates decrementally calculating a Z-score for streamed data with all components being directly decrementally calculated.

FIG. 1A illustrates an example computing system architecture 100A that facilitates decrementally calculating a Z-score for streamed data with all components being directly decrementally calculated, in other words v=p≥1 and w=0. FIG. 1A illustrates 1007 and 1006 shown in FIG. 1. Referring to FIG. 1A, computing system architecture 100A includes component calculation module 131 and Z-score calculation module 193. Component calculation module 131 may be connected to (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 may be used as the input of Z-score calculation module 193, and Z-score calculation module 193 may take the output of component calculation module and a data element selected for a Z-score calculation 192 to generate Z-score 194.

In general, data stream 190 may be a sequence of digitally encoded signals (e.g., packets of data or data packets) used to transmit or receive information that is in the process of being transmitted. Data stream 190 may stream data elements to computing system architecture 100A. Data stream 190 may stream stored data or be a live stream. Data stream 190 transmits data elements to be removed from an existing non-empty computation subset.

Decremental Z-score calculation starts from an existing non-empty computation subset where a computation subset size and one or more components of a Z-score for the computation subset may have already been initialized or calculated. If not, one or more components of a Z-score may be initialized by accessing all data elements in the computation subset and calculating the components one by one according to its definition using the all data elements in the computation subset. For example, in computing system architecture 100A, components ranging from $Cd_1$ 141 and $Cd_v$ 145 may have been initialized. As depicted in FIG. 1A, component $Cd_1$ 141 includes contribution 151 (a contribution from data element 101), contribution 152 (a contribution from data element 102), and contributions 153 (contributions from other data elements). Similarly, component $Cd_v$ 145 includes contribution 181 (a contribution from data element 101), contribution 182 (a contribution from data element 102), and contributions 183 (contributions from other data elements).

Computation subset size counter 118 may be implemented in hardware or software. When it is implemented in hardware, counter 118 may be a small device that may update a computation subset size stored in a location in counter 118. When it is implemented in software, counter 118 may be just a variable stored in RAM, hard drive or any other computing-device-readable storage media, and the content of counter 118 is a computation subset size. Computation subset size counter 118 may be used to keep track the size of a computation subset. Whenever receiving a data element, the computing system adjusts the computation subset by removing the data element from the computation subset and adjusts the computation subset size counter 118 by decreasing its content or value by 1. Computation subset size counter 118 may be accessed or received by component calculation module 131, and it may be set to a specific value by reset module 129 when decremental Z-score calculation starts working on a non-empty computation subset. Within the description of this disclosure, a computation subset size counter is equivalent to a computation subset size and may be used interchangeably.

For example, as depicted in FIG. 1A, when data element 101 is received, the counter 118 will be decreased by 1. Both the computation subset size counter 118 and data element 101 may be accessed or received by component calculation module 131. The data element 101 must be an existing data element in the computation subset.

Subsequently, data element 102 may be received. When this happens, the computation subset counter 118 will decrease its value by 1. Both the modified computation subset size counter 118 and data element 102 may be accessed or received by component calculation module 131. Similarly, data elements 102 must be an existing data element in the computation subset.

Referring to FIG. 1A, computing system architecture 100A also includes an optional data buffer 125. The optional data buffer 125 is useful when combining decremental Z-score calculation with iterative Z-score calculation. As streamed data elements are accessed or received, they may be removed from an optional data buffer 125 as needed (i.e., when combining decremental Z-score calculation with iterative Z-score calculation).

Referring to computing system architecture 100A, component calculation module 131 comprises $v(v=p\geq1)$ component calculation modules for calculating v components for data elements in a computation subset. The number of components, v, varies depending on which decremental algorithm is used. As depicted in FIG. 1A, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and decremental algorithm 133 for directly decrementally calculating component $Cd_1$. Component $Cd_v$ calculation module 162 comprises initialization module 138 for initializing component $Cd_v$ and decremental algorithm 139 for directly decrementally calculating component $Cd_v$. Initialization module 132 is configured to initialize component $Cd_1$ for data elements in a computation subset and initialization module 138 is configured to initialize component $Cd_v$ for data elements in a computation subset. Component $Cd_1$ 141 is the initial value of component $Cd_1$. Initialization module 132 may be used for an initialization of component $Cd_1$ or when Z-score calculations are reset. Initialization module 132 initializes component $Cd_1$ 141 to be a specific value composed of contribution 151, contribution 152 and contributions 153 passed in by reset module 129 for a non-empty computation subset. Similarly, initialization module 138 may be used for an initialization of component $Cd_v$ or when Z-score calculations are reset. Component $Cd_v$ 145 is the initial value of component $Cd_v$. Initialization module 138 initializes component $Cd_v$ 145 to be a specific value composed of contribution 181, contribution 182 and contributions 183 passed in by reset module 129 for a non-empty computation subset.

Decremental algorithms are also configured to calculate v components for data elements in a computation subset. Decremental algorithm 133 accesses or receives a prior component $Cd_1$ value and a removed data element as input. Decremental algorithm 133 calculates a component $Cd_1$ for the modified computation subset based on the prior component $Cd_1$ value and the removed data element. Contribution removal module 133A may remove any contribution of the removed data element from the prior component $Cd_1$. Directly decrementally calculating component $Cd_1$ for the modified computation subset may be realized by removing any contribution of the removed data element from $Cd_1$. Decremental algorithm 139 works in a similar way as decremental algorithm 133. Decremental algorithm 139 accesses or receives a prior component $Cd_v$ value and a removed data element as input. Decremental algorithm 139 calculates a component $Cd_v$ for the modified computation subset based on the prior component $Cd_v$ value and the removed data element. Contribution removal module 139A may remove any contribution of the removed data element from the prior component $Cd_v$. Directly decrementally calculating component $Cd_v$ for the modified computation subset may be realized by removing any contribution of the removed data element from $Cd_v$.

Referring to FIG. 1A, computing system architecture 100A also includes data element selected for Z-score calculation 192 and Z-score calculation module 193. Once $p(p=v\geq1)$ components of a Z-score are calculated by component calculation module 131, Z-score calculation module 193 may take a data element selected for Z-score calculation 192 as input. When a data element is selected for a Z-score calculation, Z-score calculation module 193 may access the data element selected for a Z-score calculation and calculate Z-score 194 for the selected data element using one or more decrementally calculated or initialized components.

Figure 1B:
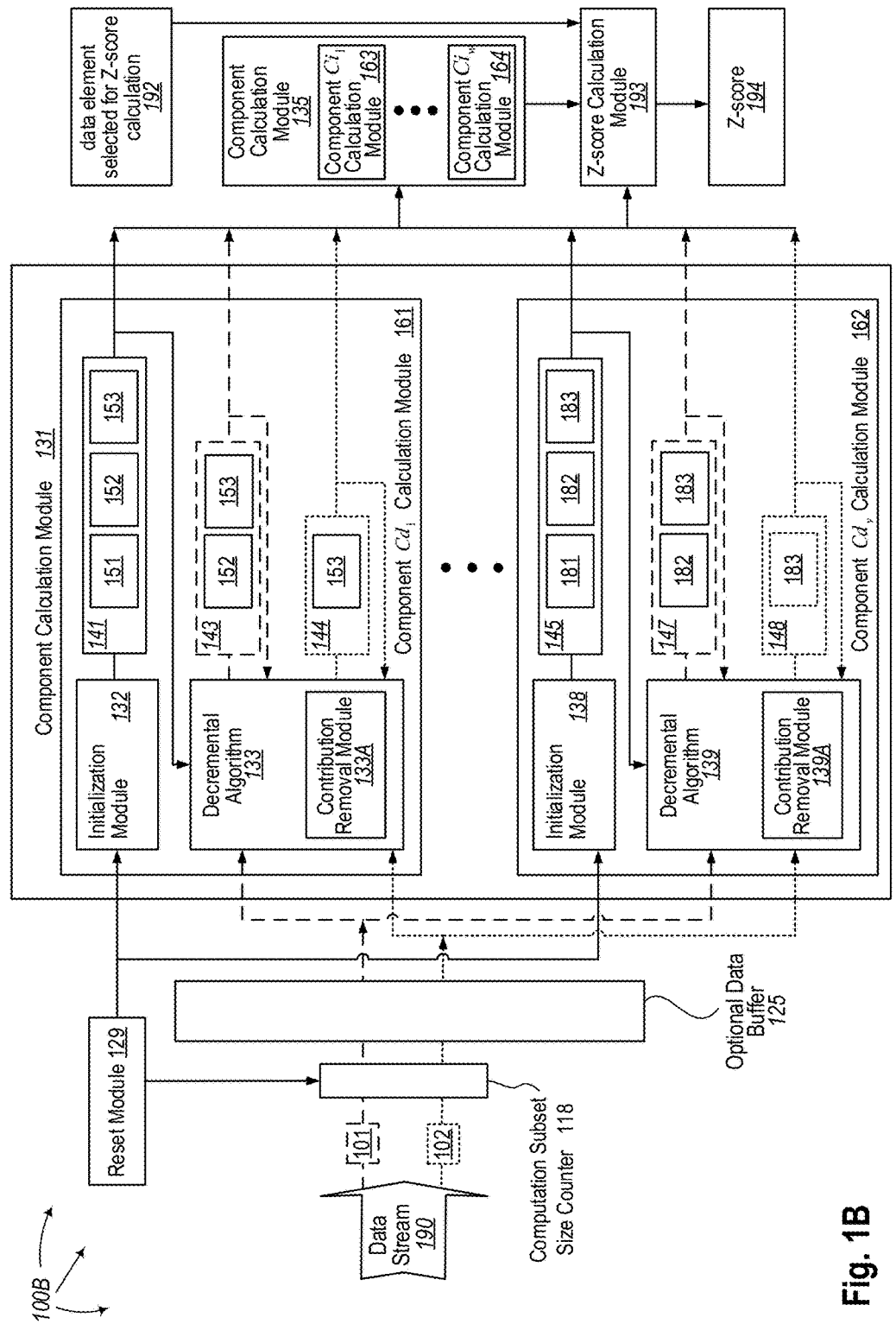
FIG. 1B illustrates an example computing system architecture that facilitates decrementally calculating a Z-score for streamed data with some components being directly decrementally calculated and some components being indirectly decrementally calculated.

FIG. 1B illustrates an example computing system architecture 100B that facilitates decrementally calculating Z-score for streamed data with some $(v(1\leq v<p))$ components being directly decrementally calculated and some $(w=p-v)$ components being indirectly decrementally calculated. The number v as well as the number w is algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with same reference numbers in 100A. Instead of repeating what have already been explained in the description about 100A, only the different part is discussed here. Computing system architecture 100B also includes component calculation module 131, which also includes v component calculation modules for directly decrementally calculating v components, however the number v in 100B may not be the same number v as in 100A, because some directly decrementally calculated components in 100A are indirectly decrementally calculated in 100B. In 100A, $v=p\geq1$, but in 100B, $1\leq v<p$. Referring to FIG. 1B, computing system architecture 100B includes component calculation module 135. The output of components calculation module 131 may be used as the input of component calculation module 135, and the output of calculation modules 131 and 135 and a data element selected for a Z-score calculation 192 may be used as the input of Z-score calculation module 193, and Z-score calculation module 193 may generate Z-score 194. Component calculation module 135 generally includes $w=p-v$ component calculation modules for indirectly decrementally calculating w components. For example, component calculation module 135 includes calculation module 163 for indirectly decrementally calculating component $Ci_1$ and calculation module 164 for indirectly decrementally calculating component $Ci_w$, and there are w−2 component calculation modules in between. Indirectly decrementally calculating w components includes indirectly decrementally calculating each of the w components one by one. Indirectly decrementally calculating a component includes accessing and using one or more components other than the component itself. The one or more components may have been initialized, directly decrementally calculated or indirectly decrementally calculated.

Referring to computing system architecture 100B, once all p(p=v+w) components have been calculated, Z-score calculation module 193 may take a data element selected for Z-score calculation 192 as input. When a data element is selected for a Z-score calculation, Z-score calculation module 193 may access the data element selected for a Z-score calculation and calculate Z-score 194 for the selected data element using one or more decrementally calculated or initialized components.

Figure 1C:
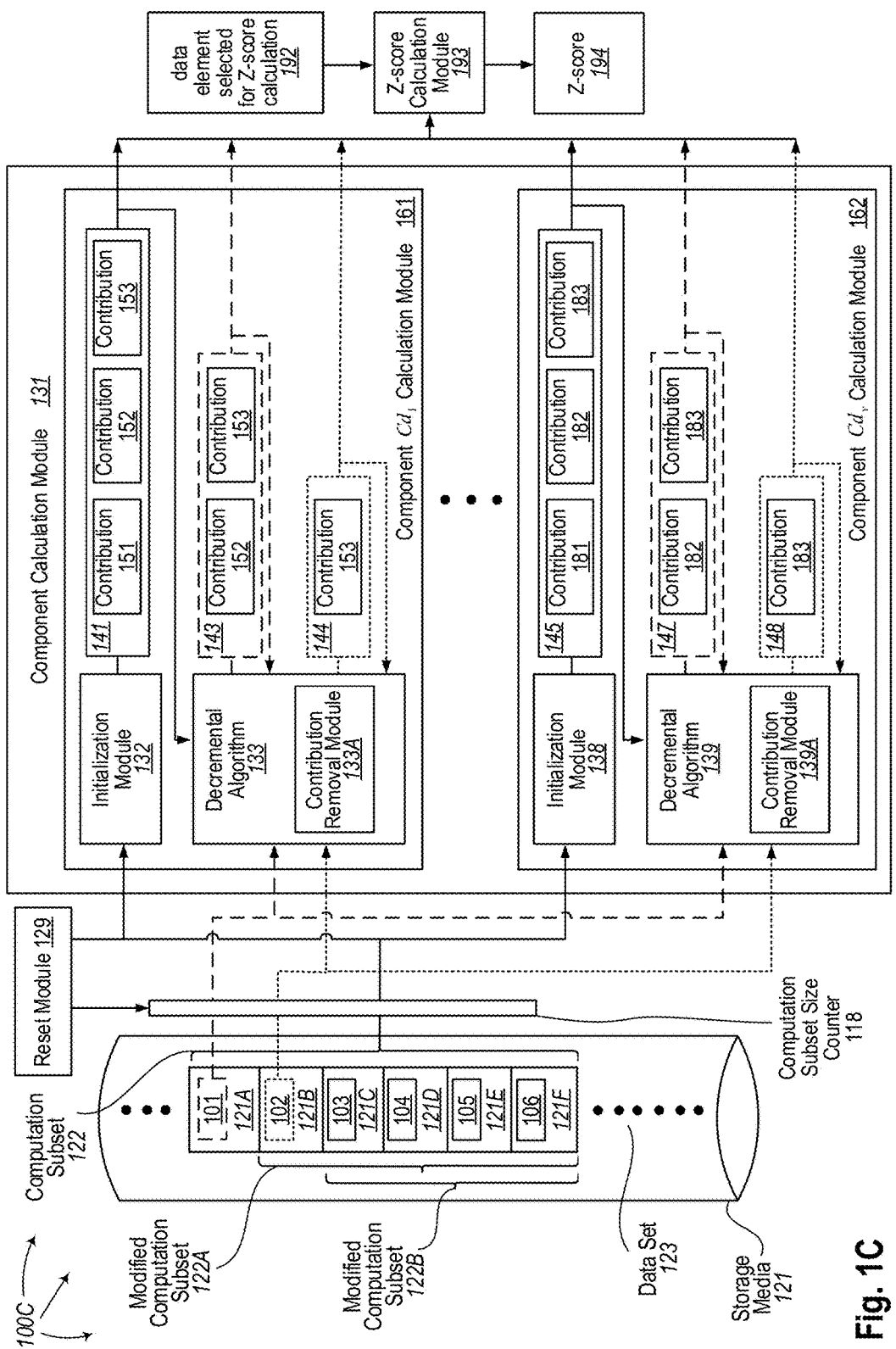
FIG. 1C illustrates an example computing system architecture that facilitates decrementally calculating Z-score for Big Data with all components being directly decrementally calculated.

FIG. 1C illustrates an example computing system architecture 100C that facilitates decrementally calculating Z-score for streamed data. FIG. 1C illustrates 1007 and 1006 shown in FIG. 1. Referring to FIG. 1C, computing system architecture 100C includes component calculation module 131. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet.

Storage media 121 comprises a data set 123. As depicted, data set 123 comprises multiple data elements stored in multiple locations of storage media 121. For example, data elements 101, 102, 103, 104, 105, 106 are stored in locations 121A, 121B, 121C, 121D, 121E and 121F respectively, etc., . . . . There are multiple data elements stored in other locations of storage media 121.

Assume that a Z-score calculation is started from computation subset 122. Computation subset 122 with a specified size of 6 (i.e., n=6) contains a number of data elements of data set 123: data elements 101, 102, 103, 104, 105 and 106. All the data elements ranging from 101 to 106 in computation subset 122 may be accessed for initializing one or more components of the Z-score.

Next, data element 101 may be accessed from locations 121A. Data element 101 will be removed from computation subset 122, then computation subset 122 becomes modified computation subset 122A. Modified computation subset 122A contains 5 data elements: 102, 103, 104, 105 and 106. The computing system may decrementally calculate a Z-score for a data element selected for Z-score calculation 192 in modified computation subset 122A.

Subsequently, data element 102 may be accessed from locations 121B. Data element 102 will be removed from modified computation subset 122A, then modified computation subset 122A becomes modified computation subset 122B. Modified computation subset 122B contains 4 data elements: 103, 104, 105 and 106. The computing system may decrementally calculate a Z-score for a data element selected for Z-score calculation 192 in modified computation subset 122B.

Referring to computing system architecture 100C, component calculation module 131 comprises v(v=p≥1) component calculation modules for calculating v components for data elements in a computation subset. The number of components, v, varies depending on which decremental algorithm is used. As depicted in FIG. 1C, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and decremental algorithm 133 for directly decrementally calculating component $Cd_1$. Component $Cd_v$ calculation module 162 comprises initialization module 138 for initializing component $Cd_v$ and decremental algorithm 139 for directly decrementally calculating component $Cd_v$. Initialization module 132 is configured to initialize component $Cd_1$ for data elements in a computation subset and initialization module 138 is configured to initialize component $Cd_v$ for data elements in a computation subset. Component $Cd_1$ 141 is the initial value of component $Cd_1$. Initialization module 132 may be used for an initialization of component $Cd_1$ or when Z-score calculations are reset. Initialization module 132 initializes component $Cd_1$ 141 to be a specific value composed of contribution 151, contribution 152 and contributions 153 passed in by reset module 129 for a non-empty computation subset. Similarly, initialization module 138 may be used for an initialization of component $Cd_v$ or when Z-score calculations are reset. Component $Cd_v$ 145 is the initial value of component $Cd_v$. Initialization module 138 initializes component $Cd_v$ 145 to be a specific value composed of contribution 181, contribution 182 and contributions 183 passed in by reset module 129 for a non-empty computation subset.

Decremental algorithms are also configured to calculate v components for a set of n data elements in a computation subset. Decremental algorithm 133 accesses or receives a prior component $Cd_1$ value and a data element to be removed from the computation subset as input. Decremental algorithm 133 calculates a component $Cd_1$ for the modified computation subset based on the prior component $Cd_1$ value and the data element removed from the computation subset. Contribution removal module 133A may remove any contribution of the removed data element from the prior component $Cd_1$. Removing any contribution of the removed data element may be used for directly decrementally calculating component $Cd_1$ for the modified computation subset. Decremental algorithm 139 works in a similar way as decremental algorithm 133. Decremental algorithm 139 receives a prior component $Cd_v$ value and a data element to be removed from the computation subset as input. Decremental algorithm 139 calculates a component $Cd_v$ for the modified computation subset based the prior component $Cd_v$ value and the data element removed from the computation subset. Contribution removal module 139A may remove any contribution of the removed data element from the prior component $Cd_v$. Removing any contribution of the removed data element may be used for directly decrementally calculating component $Cd_v$ for the modified computation subset.

Referring to FIG. 1C, computing system architecture 100C also includes Z-score calculation module 193. Once p(p=v≥1) components of a Z-score are directly decrementally calculated by component calculation module 131, Z-score calculation module 193 may take the output of component calculation module 131 and a data element selected for a Z-score calculation 192 to calculate a Z-score 194 using one or more decrementally calculated or initialized components.

Figure 1D:
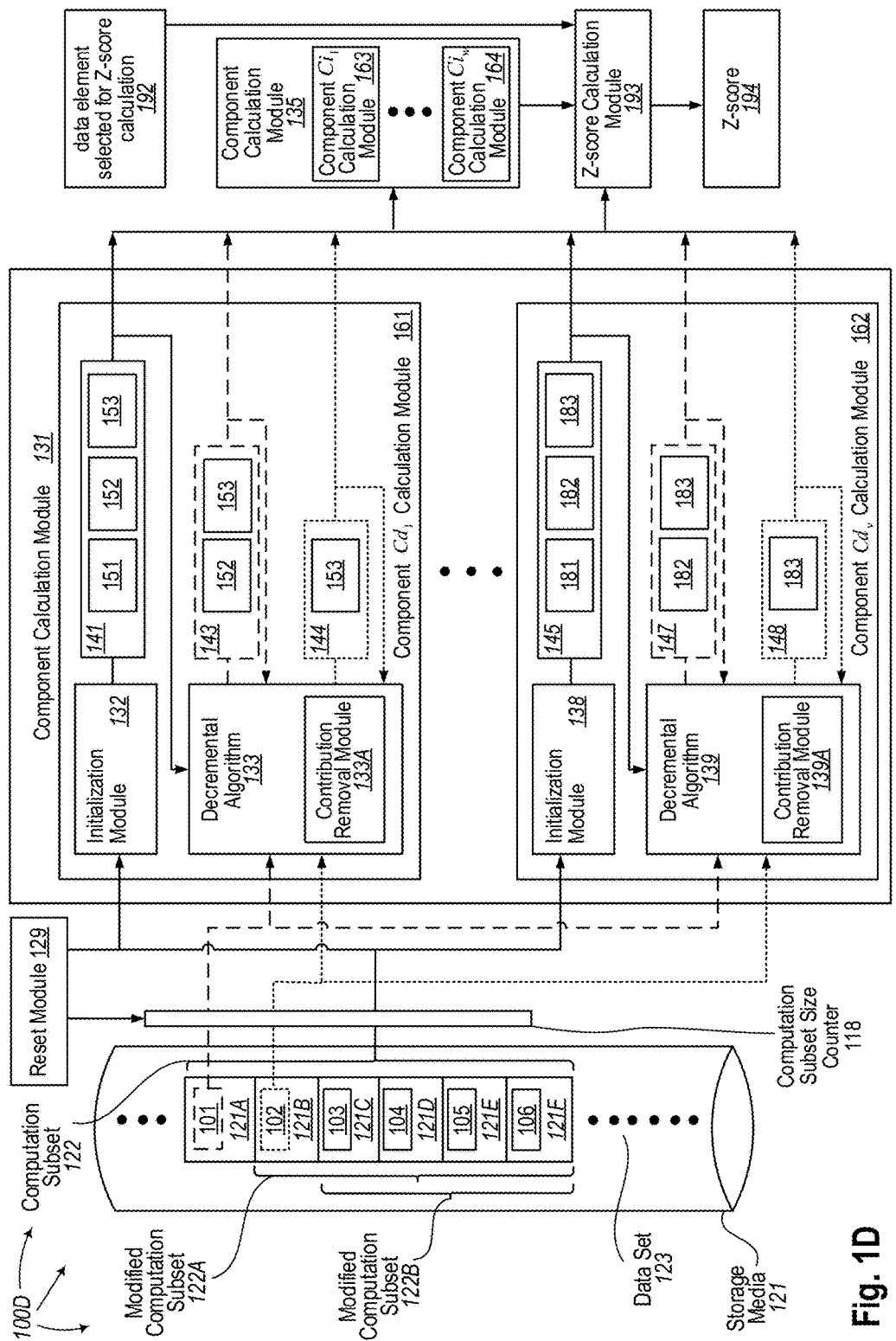
FIG. 1D illustrates an example computing system architecture that facilitates decrementally calculating Z-score for Big Data with some components being directly decrementally calculated and some components being indirectly decrementally calculated.

FIG. 1D illustrates an example computing system architecture 100D that facilitates decrementally calculating Z-score for Big Data with some ($v(1 \leq v < p)$) components being directly decrementally calculated and some ($w=p-v$) components being indirectly decrementally calculated. The number v as well as the number w is algorithm dependent. Many parts included in computing system architectures 100D and 100C have same reference numbers. Those parts have similar structures and work in similar ways. In certain implementations, the difference between computing system architectures 100D and 100C may be that architecture 100D includes a component calculation module 135. All parts except component calculation module 135 in 100D work in a similar way as those parts with same reference numbers in 100C. Instead of repeating what have already been explained in the description about 100C, only the different part is discussed here. Computing system architecture 100D also includes component calculation module 131, which also includes v component calculation modules for directly decrementally calculating v components, however the number v in 100D may not be the same number v as in 100C, because some directly decrementally calculated components in 100C are indirectly decrementally calculated in 100D. In 100C, $v=p \geq 1$, but in 100D, $1 \leq v < p$. Referring to FIG. 1D, computing system architecture 100D includes component calculation module 135. The output of components calculation module 131 may be used as the input of component calculation module 135, and the output of calculation modules 131 and 135 may be used as the input of Z-score calculation module 193, and Z-score calculation module 193 may take the output of component calculation module 131 and a data element selected for a Z-score calculation 192 to generate Z-score 194. Component calculation module 135 generally includes $w=p-v$ component calculation modules for indirectly decrementally calculating w components. For example, component calculation module 135 includes component calculation module 163 for indirectly decrementally calculating component $Ci_1$ and component calculation module 164 for indirectly decrementally calculating component $Ci_w$, and there are $w-2$ component calculation modules in between. Indirectly decrementally calculating w components includes indirectly decrementally calculating each of the w components one by one. Indirectly decrementally calculating a component includes accessing and using one or more components other than the component itself. The one or more components may have been initialized, directly decrementally calculated or indirectly decrementally calculated.

Referring to computing system architecture 100D, once all $p(p=v+w)$ components have been calculated, Z-score calculation module 193 may take a data element selected for Z-score calculation 192 as input. When a data element is selected for a Z-score calculation, Z-score calculation module 193 may access the data element selected for a Z-score calculation and calculate Z-score 194 for the selected data element using one or more decrementally calculated or initialized components.

Figure 2:
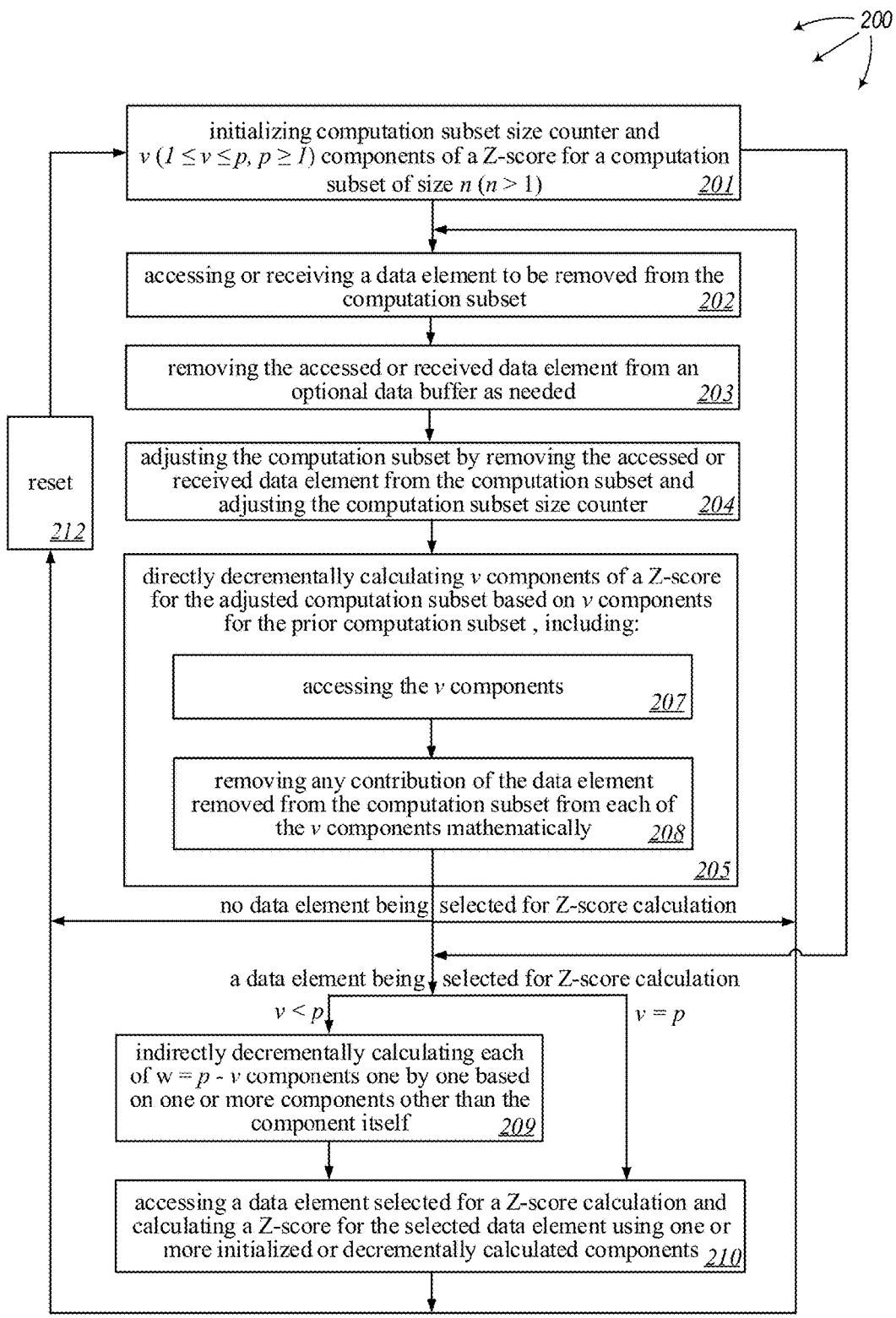
FIG. 2 illustrates a flow chart of an example method for decrementally calculating a Z-score for Big Data or streamed data.

FIG. 2 illustrates a flow chart of an example method 200 for decrementally calculating a Z-score for Big Data or streamed data. Method 200 will be described with respect to the components and data of computing system architectures 100A, 100B, 100C and 100D.

Method 200 includes initializing computation subset size counter 118 and $v(1 \leq v \leq p, p \geq 1)$ components of a Z-score for a computation subset of size n ($n>1$) (201). For example, initialization module 132 may initialize component $Cd_1$ 141 with contribution 151 (a contribution from data element 101), contribution 152 (a contribution from data element 102), and contributions 153 (contributions from other data elements). Similarly, initialization module 138 may initialize component $Cd_v$ 145 with contribution 181 (a contribution from data element 101), contribution 182 (a contribution from data element 102), and contribution 183 (contributions from other data elements).

Method 200 includes accessing or receiving a data element to be removed from the computation subset (202). For example, data element 101 may be accessed or received. Method 200 includes removing the accessed or received data element from an optional data buffer as needed (203). For example, when combining decremental Z-score calculation with iterative Z-score calculation, data element 101 may be removed from an optional data buffer 125 as needed. Method 200 includes modifying the computation subset by removing the accessed or received data element from the computation subset and modifying the computation subset size counter (204). For example, data element 101 may be removed from the computation subset and computation subset size counter 118 may be modified by decreasing its current value by 1 upon receiving the data element 101.

Method 200 includes directly decrementally calculating $v(1 \leq v \leq p)$ components of a Z-score for the modified computation subset based on v components for the prior computation subset (205). For example, decremental algorithm 133 may be used for directly decrementally calculating component $Cd_1$ 143 based on component $Cd_1$ 141 and data element 101, and decremental algorithm 139 may be used for directly decrementally calculating component $Cd_v$ 147 based on component $Cd_v$ 145 and data element 101.

Directly decrementally calculating v components of a Z-score for the modified computation subset includes accessing the v components of the Z-score in the prior computation subset (207). For example, decremental algorithm 133 may access component $Cd_1$ 141. Similarly, decremental algorithm 139 may access component $Cd_v$ 145.

Directly decrementally calculating v components of a Z-score for the modified computation subset includes removing any contribution of the removed data element from each of the v components mathematically (208). For example, decrementally calculating component $Cd_1$ 143 may include contribution removal module 133A removing contribution 151 from component 141 mathematically, and decrementally calculating component $Cd_v$ 147 may include contribution removal module 139A removing contribution 181 from component $Cd_v$ 145 mathematically. Contribution 151 and 181 are contributions from data element 101.

As depicted in FIG. 1A, component $Cd_1$ 143 includes contribution 152 (a contribution from data element 102) and contributions 153 (contributions from other data elements). Similarly, component $Cd_v$ 147 includes contribution 182 (a contribution from data element 102) and contribution 183 (contributions from other data elements).

Besides directly decrementally calculated components, some components may be indirectly decrementally calculated. When not all components are directly decrementally calculated ($v<p$), Method 200 includes indirectly decrementally calculating $w=p-v$ components one by one based on one or more components other than the component itself (209). Since the w indirectly decrementally calculated components are calculated using other components, they might not need to be initialized. In addition, the w indirectly decrementally calculated components might not need to be calculated in every iteration (i.e., a data element to be removed is accessed or received and the data element is removed from the computation subset). They only need to be calculated when a data element is selected for a Z-score calculation to save computation time. For example, referring to FIG. 1B where some components are directly decrementally calculated and some are indirectly decrementally calculated, calculation module 163 may indirectly decrementally calculate $Ci_1$ based on one or more components other than $Ci_1$, and the one or more components may have been initialized, directly decrementally calculated or indirectly decrementally calculated. Similarly, calculation module 164 may indirectly decrementally calculate $Ci_v$ based on one or more components other than $Ci_v$, and the one or more components may have been initialized, directly decrementally calculated or indirectly decrementally calculated. For a given component, it is possible that it is directly decrementally calculated in one algorithm but indirectly decrementally calculated in another algorithm. For a given algorithm, directly decrementally calculated components must be calculated whenever there is a change in the computation subset (e.g., when an existing data element is removed from the computation subset), no matter if a data element is selected for a Z-score calculation or not; however, an indirectly decrementally component may be calculated as needed, i.e., it only needs to be calculated when a data element is selected for a Z-score calculation.

Method 200 includes accessing a data element selected for a Z-score calculation and calculating a Z-score for the selected data element using one or more decrementally calculated components of the Z-score (210).

202-208 may be repeated as more data elements are accessed or received. 209-210 may be repeated as needed. For example, subsequent to calculating components ranging from $Cd_1$ 143 to $Cd_v$ 147, data element 102 may be accessed or received.

Decremental algorithm 133 may be used for calculating component $Cd_1$ 144 by reusing component $Cd_1$ 143. Decremental algorithm 133 may access data element 102. Decremental algorithm 133 may access component $Cd_1$ 143. Decrementally calculating component $Cd_1$ 144 may include contribution removal module 133A removing contribution 152 from component $Cd_1$ 143 mathematically. Contribution 152 is a contribution of data element 102.

Similarly, decremental algorithm 139 may be used for calculating component $Cd_v$ 148 by reusing component $Cd_v$ 147. Decremental algorithm 139 may access data element 102. Decremental algorithm 139 may access component $Cd_v$ 147. Decrementally calculating component $Cd_v$ 148 may include contribution removal module 139A removing contribution 182 from component $Cd_v$ 147 mathematically. Contribution 182 is a contribution of data element 102.

As depicted, component $Cd_1$ 144 includes contributions 153 (contributions from other data elements), while component $Cd_v$ 148 includes contribution 183 (contributions from other data elements).

When a next streaming data element is accessed or received, component $Cd_1$ 144 may be used to decrementally calculate a component $Cd_1$ for the modified computation subset and component $Cd_v$ 148 may be used to decrementally calculate a component $Cd_v$ for the modified computation subset.

As depicted in FIG. 2, reset 212 may be used for resetting decremental Z-score calculation. When reset 212 is invoked after 205 or 210, the computation subset size counter and v components of a Z-score will be initialized. For example, component $Cd_1$ 141 may be initialized to a specific value when the computation subset is non-empty and component $Cd_1$ 141 has already been calculated. Such case may happen when combining decremental Z-score calculation with iterative Z-score calculation or incremental Z-score calculation. Component $Cd_v$ 145 may be initialized in the same way.

Figure 3A:
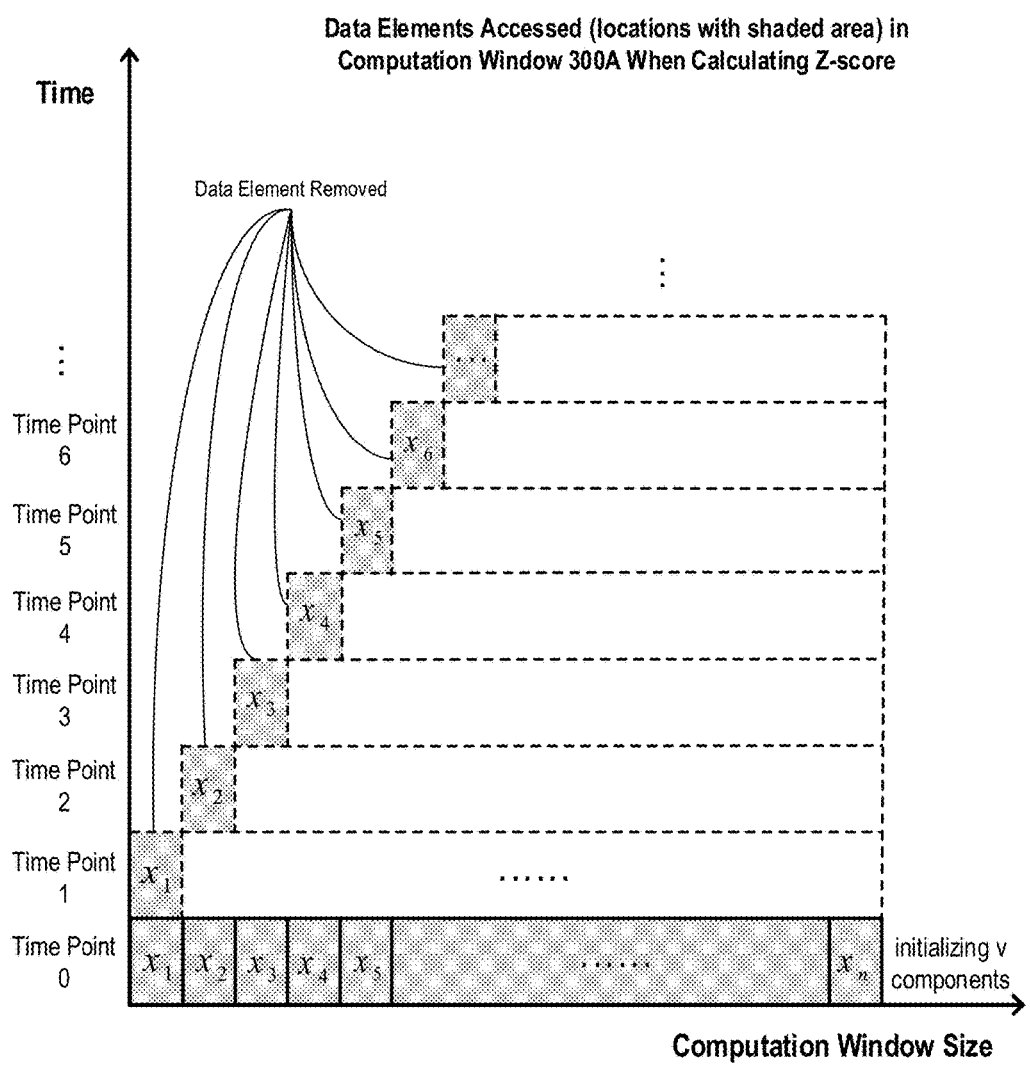
FIG. 3A illustrates data that is accessed from a computation window for decrementally calculating a Z-score on streamed data.

FIG. 3A illustrates data that is accessed from a computation window 300A for decrementally calculating a Z-score on streamed data. Computation window 300A should be non-empty where v components have already been calculated or initialized. The difference between a computation window and a computation subset is that the data elements in a computation window are ordered (e.g., the data element is always removed from either the left end or the right end of a computation window). For example, referring to FIG. 3A, a least recent data element is always removed from the left end of computation window 300A. As time progresses, an existing data element, for example, data element $x_1$, then $x_2$, then $x_3$, ... is removed from the computation window and accessed respectively for directly decrementally calculating v components of a Z-score for the modified computation subset, indirectly decrementally calculating w=p−v components, and calculating the Z-score using one or more decrementally calculated components. The v components may be directly decrementally calculated using the data element removed from the computation window and the v components from the prior computation window, while other data elements in computation window 300A are not touched. For a given decremental algorithm, v is a constant, so the number of operations for directly decrementally calculating v components is a constant, and the number of operations for indirectly decrementally calculating w=p−v components is also a constant. Thus, the computation workload for calculating all p components for a given computation window with size n is reduced and a Z-score may be calculated using one or more decrementally calculated components. The larger the n, the more substantial the reduction in computation workload.

Figure 3B:
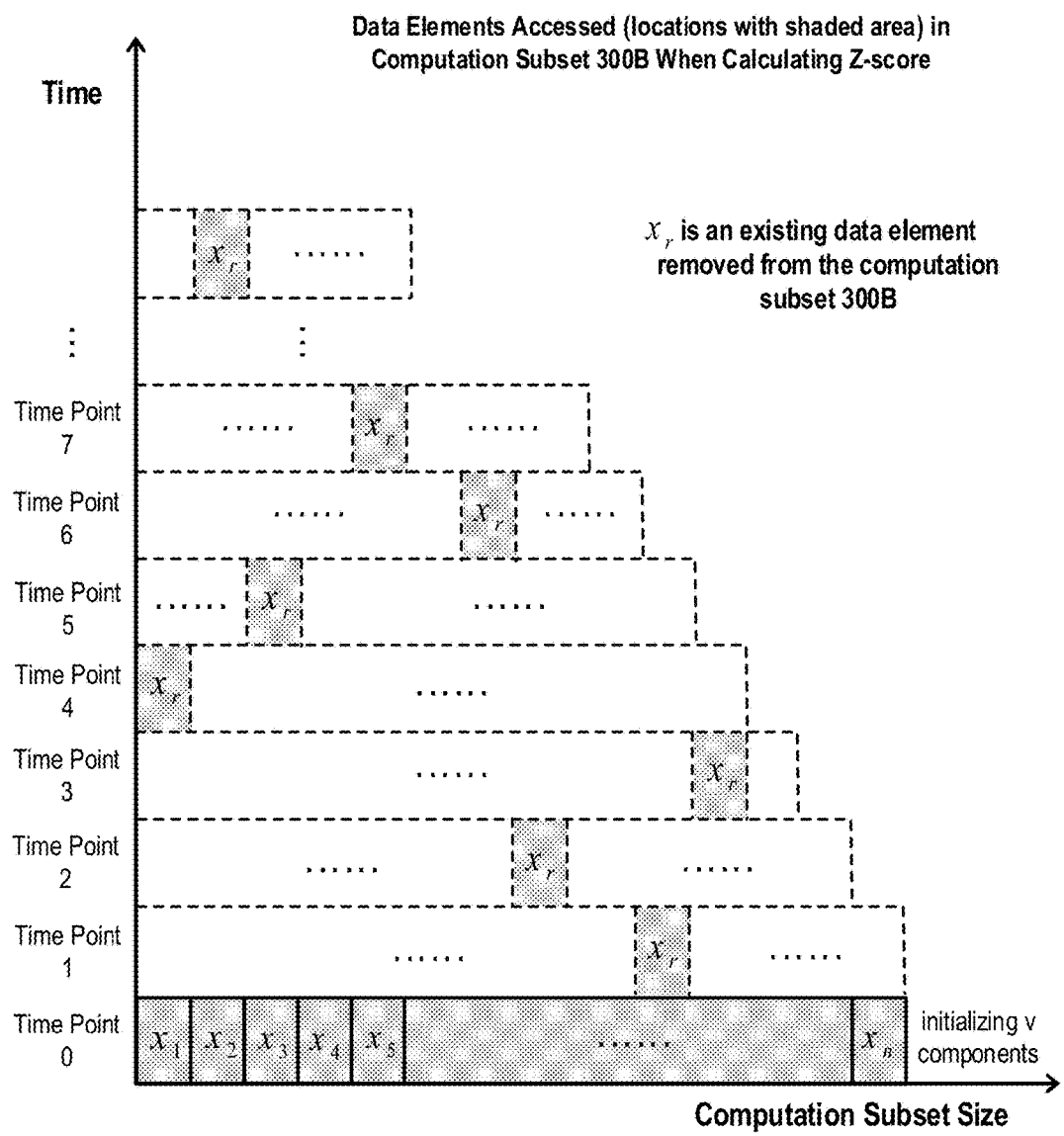
FIG. 3B illustrates data that is accessed from a computation subset for decrementally calculating a Z-score on Big Data.

FIG. 3B illustrates data that is accessed from a computation subset 300B for decrementally calculating a Z-score on Big Data. Computation subset 300B should be non-empty where v components have already been calculated or initialized. The difference between a computation subset and a computation window is that the data elements in a computation subset are not ordered (e.g., a data element may be removed from any position of a computation subset). For example, referring to FIG. 3B, an existing data element may be removed from any position of computation subset 300B. As time progresses, an existing data element in computation subset 300B, for example, the data element $x_r$ at the position indicated by shaded area is removed from the computation subset and accessed for directly decrementally calculating v components of a Z-score for the modified computation subset, indirectly decrementally calculating w=p−v components, and calculating the Z-score using one or more decrementally calculated components. The v components may be directly decrementally calculated using the data element removed from the computation subset and the v components from the previous computation subset, while other data elements in computation subset 300B are not touched. For a given decremental algorithm, v is a constant, so the number of operations for directly decrementally calculating v components is a constant, and the number of operations for indirectly decrementally calculating w=p−v components is also a constant. Thus, the computation workload for calculating all p components for a given computation subset with size n is reduced and a Z-score may be calculated using one or more decrementally calculated components. The larger the n, the more substantial the reduction in computation workload.

FIG. 4A illustrates the definition of a Z-score. Suppose a computation subset $X=\{x_i|i=1,\ldots,n\}$ is a subset of a Big Data set or streamed data which contains the data elements involved in a Z-score calculation. Equation 401 is a traditional equation for calculating a sum $S_k$ of all the data elements in computation subset X in the $k^{th}$ iteration. Equation 402 is a traditional equation for calculating a mean $\bar{x}_4$ of all the data elements in computation subset X in the $k^{th}$ iteration. Equation 403 is a traditional equation for calculating a Z-score $Z_k(x_m)$ for a data element $x_m$ for computation subset X in the $k^{th}$ iteration. Suppose X has changed after some time period, say a data element $x_r$ is removed from computation subset X. Whenever a data element is removed, the computation subset is considered as a modified computation subset. A new iteration of calculation is started each time any component of a Z-score is recalculated due to a data change in the computation subset. Now, suppose $Z_k(x_m)$ which is a Z-score of data element $x_m$ has already been calculated, a Z-score of any data element in the computation subset X needs to be calculated again after a data element $x_r$ has been removed from X. Define the modified computation subset as X'. The modified computation subset size becomes n−1. The iteration becomes $k+1^{th}$ iteration. Equation 404 is a traditional equation for calculating a sum $S_{k+1}$ of all the data elements in modified computation subset X' in the $k+1^{th}$ iteration. Equation 405 is a traditional equation for calculating a mean $\bar{x}_{k+1}$ of all the data elements for modified computation subset X' in the $k+1^{th}$ iteration. Equation 406 is a traditional equation for calculating a Z-score $Z_{k+1}(x_m)$ for data element $x_m$ for modified computation subset X' in the $k+1^{th}$ iteration.

FIG. 4B illustrates some example components of a Z-score and a few basic decremental component calculation equations used by different decremental algorithms. For example, $$\frac{1}{n}\sum_1^n (x_i - \bar{x}_k)^2, \sum_1^n (x_i - \bar{x}_k)^2, \sum_1^n x_i, \frac{1}{n}\sum_1^n x_i$$

and $\sum_1^n x_i^2$ may be considered as components of a Z-score. A sum $$S_k = \sum_1^n x_i$$

or a mean $$\bar{x}_k = \frac{1}{n}\sum_1^n x_i$$

is a component to be used in several decremental algorithms, so two basic decremental equations for decrementally calculating a sum and a mean are illustrated in FIG. 4B. Equation 407 may be used for directly decrementally calculating a sum $S_{k+1}$ of all the data elements in the modified computation subset X'. Equation 408 may be used for directly decrementally calculating a mean $\bar{x}_{k+1}$ of all the data elements in the modified computation subset X'. Either a sum $S_{k+1}$ or a mean $\bar{x}_{k+1}$ will be used in all three decremental Z-score calculation algorithms described later.

FIG. 4C illustrates the first example decremental Z-score calculation algorithm (decremental algorithm 1) for decrementally calculating a Z-score based on decrementally calculated population variance $vp_{k+1}$. Equation 401 may be used for initially calculating a sum $S_k$ of data elements in the first computation subset of size n. Equation 402 may be used for initially calculating a mean $\bar{x}_k$ of data elements in the first computation subset. Equation 409 may be used for initially calculating $vp_k$ in the first computation subset once $S_k$ or $\bar{x}_k$ is calculated. Equation 412 may be used for initially calculating a Z-score of $x_m$ in the first computation subset once component $vp_k$ is calculated. Equation 410 is a traditional way for calculating $vp_{k+1}$ in a modified computation subset X'. Equation 407 may be used for directly decrementally calculating a sum $S_{k+1}$ of data elements in a modified computation subset X'. Equation 408 may be used for directly decrementally calculating a mean $\bar{x}_{k+1}$ of data elements in a modified computation subset X'. Equation 411 may be used for directly decrementally calculating $vp_{k+1}$ in a modified computation subset X' of size n−1 once $S_{k+1}$ or $\bar{x}_{k+1}$ is calculated. Equation 413 may be used for indirectly decrementally calculating a Z-score of $x_m$ in a modified computation subset X' once component $vp_{k+1}$ is calculated.

FIG. 4D illustrates the second example decremental Z-score calculation algorithm (decremental algorithm 2) for decrementally calculating a Z-score based on decrementally calculated components $S_k$ or $\bar{x}_k$, $S_{k+1}$ or $\bar{x}_{k+1}$ and $SSD_{k+1}$. Equation 401 may be used for initially calculating a sum $S_k$ of data elements in the first computation subset of size n. Equation 402 may be used for initially calculating a mean $\bar{x}_k$ of data elements in the first computation subset. Equation 414 may be used for initially calculating $SSD_k$ in the first computation subset once $S_k$ or $\bar{x}_k$ is calculated. Equation 417 may be used for initially calculating a Z-score of $x_m$ in the first computation subset once $SSD_k$ is calculated. Equation 415 is a traditional way for calculating $SSD_{k+1}$ in a modified computation subset. Equation 407 may be used for directly decrementally calculating a sum $S_{k+1}$ of data elements in a modified computation subset X'. Equation 408 may be used for directly decrementally calculating a mean $\bar{x}_{k+1}$ of data elements in a modified computation subset X'. Equation 416 may be used for directly decrementally calculating $SSD_{k+1}$ in a modified computation subset X' once $S_{k+1}$ or $\bar{x}_{k+1}$ is calculated. Equation 418 may be used for indirectly decrementally calculating a Z-score of $x_m$ in a modified computation subset X' once $SSD_{k+1}$ is calculated.

FIG. 4E illustrates the third example decremental Z-score calculation algorithm (decremental algorithm 3) for decrementally calculating a Z-score based on decrementally calculated components $S_{k+1}$ or $\bar{x}_{k+1}$ and $SS_{k+1}$. Equation 401 may be used for initially calculating a sum $S_k$ of data elements in the first computation subset of size n. Equation 402 may be used for initially calculating a mean $\bar{x}_k$ of data elements in the first computation subset. Equation 419 may be used for initially calculating $SS_k$ in the first computation subset. Equation 422 may be used for initially calculating a Z-score of $x_m$ in the first computation subset once $S_k$ or $\bar{x}_k$ and $SS_k$ are calculated. Equation 420 is a traditional way for calculating $SS_{k+1}$ in a modified computation subset. Equation 407 may be used for directly decrementally calculating a sum $S_{k+1}$ of data elements in a modified computation subset X'. Equation 408 may be used for directly decrementally calculating a mean $\bar{x}_{k+1}$ of data elements in a modified computation subset X'. Equation 421 may be used for directly decrementally calculating a sum of the squares of data elements $SS_{k+1}$ in a modified computation subset X'. Equation 423 may be used for indirectly decrementally calculating a Z-score of $x_m$ in a modified computation subset X' once components $S_{k+1}$ and/or $\bar{x}_{k+1}$ and $SS_{k+1}$ are calculated.

To demonstrate decremental Z-score calculation algorithms and their comparison against traditional algorithms, three examples are given below. Three computation subsets of data elements are used. For traditional algorithms, the calculations for all three computation subsets are exactly the same. For decremental algorithms, initialization of one or more components is performed for the first computation subset, and decremental calculations are performed for the second and third computation subsets.

FIG. 5A illustrates an example of calculating a Z-score of $x_8$ for Big Data Set 501 using traditional algorithms. Computation subset size 503 ($n$) is 8. Computation subset 502 includes 8 data elements in Big Data Set 501. The data element of $x_8$ is chosen just for illustrating the calculation procedure. Any other data element in computation subset 502 may be chosen for calculating its respective Z-score. For each computation subset, equation 402 may be used for calculating a mean and equation 403 is used for calculating a Z-score. For example, for computation subset 502 the mean is calculated to be 4.75. Calculating the mean includes 1 division operation and 7 addition operations. Calculating $$\frac{1}{8} \sum_{1}^{8} (x_i - \bar{x}_1)^2$$

includes 1 division, 8 multiplications, 7 additions and 8 subtractions. Calculating the Z-score of $x_8$ includes 1 square root, 1 division, and 1 subtraction. Thus, the total number of operations includes 1 square root, 3 divisions, 8 multiplications, 14 additions, and 9 subtractions for calculating the Z-score of $x_8$ in computation subset 502.

The same equations may be used for calculating the Z-score of $x_8$ for computation subset 504 as shown in FIG. 5A Cont'd 1. Again, the data element of $x_8$ is chosen just for illustrating the calculation procedure. Any other data element in computation subset 504 may be chosen for calculating its Z-score. Computation subset 504 contains one less data element $x_r$ from Big Data set 501 than computation subset 502. Computation subset size 505 becomes 7. Thus, there are less operations involved in the Z-score calculation. The total number of operations includes 1 square root, 3 divisions, 8 multiplications, 14 additions, and 8 subtractions for calculating the Z-score of $x_8$ in computation subset 504.

The same equations may be used for calculating the Z-score of $x_8$ for computation subset 506 as shown in FIG. 5A Cont'd 2. Again, the data element of $x_8$ is chosen just for illustrating the calculation procedure. Any other data element in computation subset 504 may be chosen for calculating its Z-score. Computation subset 506 contains one less data element $x_r$ from Big Data set 501 than computation subset 504. Computation subset size 507 becomes 6. Thus, there are less operations involved in the Z-score calculation. The total number of operations includes 1 square root, 3 divisions, 6 multiplications, 10 additions, and 7 subtractions for calculating the Z-score of $x_8$ in computation subset 506. For a computation subset with size n, traditional algorithms typically take 1 square root, 3 divisions, n multiplications, 2(n−1) additions and n+1 subtractions for calculating a Z-score of a data element without any optimization.

FIG. 5B illustrates an example of calculating a Z-score of $x_8$ using decremental algorithm 1. A mean instead of a sum is used in this example. The calculations for computation subset 502 are essentially the same as shown in FIG. 5A, which includes calculating the initial value of components $\bar{x}_1$ and $vp_1$. In practice, such calculation will not happen, because decremental Z-score calculation would start from an existing non-empty computation subset where those components have already been calculated. Using traditional algorithms to calculate those components on this non-empty computation subset here is only for the purpose of illustrating the decremental algorithm. There are a total of 1 square root, 3 divisions, 8 multiplications, 14 additions, and 9 subtractions for calculating the Z-score of $x_8$ in computation subset 502.

However, starting from computation subset 504, the Z-score of $x_8$ may be decrementally calculated. The result of 8-1 is pre-calculated and kept for future usage to save computations. Equations 408 may be used for decrementally calculating component $\bar{x}_2$ for the computation subset 504 based on component $\bar{x}_1$ for the computation subset 502, and equation 411 may be used for decrementally calculating the component $vp_2$ for computation subset 504 based on components $vp_1$, $\bar{x}_1$ and $\bar{x}_2$. Equation 408 includes 1 division, 1 multiplication and 1 subtraction based on pre-calculated result of 8-1. Equation 411 includes 1 division, 1 multiplication, and 3 subtractions based on pre-calculated result of 8-1. Thus, the total number of operations includes 1 square root, 3 divisions, 2 multiplications, and 6 subtractions for calculating the Z-score of $x_8$ in computation subset 504.

Equations 408, 411 and 413 may also be used for decrementally calculating a Z-score of $x_8$ for computation subset 506 from the components for computation subset 504. Though the computation subset size is changed, the computation workload remains constant. These calculations also include 1 square root, 3 divisions, 2 multiplications, and 6 subtractions for calculating the Z-score of $x_8$ in computation subset 506. As such, the number of operations used when decrementally calculating a Z-score of a data element is (potentially substantially) less than when using traditional equations with a large computation subset size.

FIG. 5C illustrates an example of calculating a Z-score of $x_8$ using decremental algorithm 2. A mean instead of a sum is used in this example. The calculations for computation subset 502 use traditional equations to calculate the initial values of components $\bar{x}_1$ and $SSD_1$. In practice, such calculation will not happen, because decremental Z-score calculation would start from an existing non-empty computation subset where those components have already been calculated. Using traditional algorithms to calculate those components on this non-empty computation subset here is only for the purpose of illustrating the decremental algorithm. Equation 402 is used for calculating an initial value of component $\bar{x}_1$, and equation 414 is used for calculating an initial value of component $SSD_1$. Equation 417 is used for calculating the initial Z-score of $x_8$. There is a total of 1 square root, 3 divisions, 8 multiplications, 14 additions, and 9 subtractions for calculating the Z-score of $x_8$ in computation subset 502.

However, starting from computation subset 504, the Z-score of $x_8$ may be decrementally calculated. The result of 8-1 is pre-calculated and kept for future usage to save computations. Equations 408 may be used for decrementally calculating component $\bar{x}_2$ for the computation subset 504 based on component $\bar{x}_1$ for the computation subset 502, and equation 416 may be used for decrementally calculating component $SSD_2$ for computation subset 504 based on components $SSD_1$, $\bar{x}_1$ and $\bar{x}_2$. Equation 418 may be used for decrementally calculating the Z-score of $x_8$ for computation subset 504 using components $\bar{x}_2$ and $SSD_2$. Equation 408 includes 1 division, 1 multiplication and 1 subtraction based on pre-calculated result of 8-1. Equation 416 includes 1 multiplication and 3 subtractions. Equation 418 includes 1 square root, 2 divisions and 1 subtraction based on pre-calculated result of 8-1. Thus, the total number of operations includes 1 square root, 3 divisions, 2 multiplications, and 6 subtractions for calculating the Z-score of $x_8$ in computation subset 504.

Equations 408, 416, and 418 may also be used for decrementally calculating the Z-score of $x_8$ for computation subset 506 from the components for computation subset 504. Though the computation subset size is decreased, the computation workload remains constant. These calculations also include 1 square root, 3 divisions, 2 multiplications, and 6 subtractions for calculating the Z-score of $x_8$ in computation subset 506. As such, the number of operations used when decrementally calculating a Z-score of a data element is (potentially substantially) less than when using traditional equations with a large computation subset size.

FIG. 5D illustrates an example of calculating a Z-score of $x_8$ using decremental algorithm 3. A mean instead of a sum is used in this example. The calculations for computation subset 502 use traditional equations to calculate the initial values of components $\bar{x}_1$ and $SS_1$. In practice, such calculation will not happen, because decremental Z-score calculation would start from an existing non-empty computation subset where those components have already been calculated. Using traditional algorithms to calculate those components on this non-empty computation subset here is only for the purpose of illustrating the decremental algorithm. Equation 402 may be used for calculating an initial value of component $\bar{x}_1$, and equation 419 may be used for calculating an initial value of component $SS_1$. Equation 422 may be used for calculating the Z-score of $x_8$. There is a total of 1 square root, 3 divisions, 9 multiplications, 14 additions, and 2 subtractions for calculating the Z-score of $x_8$ in computation subset 502.

However, starting from computation subset 504, the Z-score of $x_8$ may be decrementally calculated. The result of 8-1 is pre-calculated and kept for future usage to save computations. Equations 408 may be used for decrementally calculating component $\bar{x}_2$ for the computation subset 504 based on component $\bar{x}_1$ for the computation subset 502, and equation 421 may be used for decrementally calculating component $SS_2$ for the computation subset 504 based on component $SS_1$ for the computation subset 502. Equation 422 may be used for decrementally calculating the Z-score of $x_8$ for the computation subset 504 based on components $SS_2$ and $\bar{x}_2$. Equation 408 includes 1 division, 1 multiplication and 1 subtraction based on pre-calculated result of 8-1. Equation 421 includes 1 multiplication and 1 subtraction. Equation 422 includes 1 square root, 1 division, 1 multiplication, and 2 subtractions based on pre-calculated result of 8-1. Thus, the total number of operations includes 1 square root, 3 divisions, 3 multiplications, and 5 subtractions for calculating the Z-score of $x_8$ in computation subset 504.

Equations 408, 421, and 422 may also be used for decrementally calculating a Z-score of $x_8$ for computation subset 506 from the components for computation subset 504. Though the computation subset size is changed, the computation workload remains constant. These calculations also include 1 square root, 3 divisions, 3 multiplications, and 5 subtractions for calculating the Z-score of $x_8$ in computation subset 506. As such, the number of operations used when decrementally calculating a Z-score of a data element is (potentially substantially) less than when using traditional equations with a large computation subset size.

FIG. 6 illustrates computational loads for traditional algorithms and decremental algorithms for n=6. As depicted, there are fewer multiplication operations, fewer addition operations, and fewer subtraction operations using any one of the decremental algorithms.

FIG. 7 illustrates computational loads for traditional algorithms and decremental algorithms for n=1,000,000. As depicted, there are substantially fewer multiplication operations, fewer addition operations, and fewer subtraction operations using any one of the decremental algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for calculating a Z-score for a selected data element for a modified computation subset, the method comprising:
   initializing, by a computing-device-based computing system, a computation subset size counter, a sum or a mean or both, and at least one additional component of a Z-score different from a sum and a mean for a pre-modified computation subset of a data stream or a data set on one or more storage media, wherein the pre-modified computation subset contains a specified number, n (n≥6), of data elements from the data stream or the data set, and the at least one additional component of a Z-score is a quantity or expression appearing in a Z-score's definition equation or any transforms of the equation;
   accessing or receiving, by the computing-device-based computing system, a data element to be removed from the pre-modified computation subset;
   modifying, by the computing-device-based computing system, the pre-modified computation subset:
      removing the accessed or received data element from the pre-modified computation subset; and
      modifying the computation subset size counter;
   decrementally deriving, by the computing-device-based computing system, a sum or a mean or both for the modified computation subset;
   directly decrementally deriving, by the computing-device-based computing system and based at least in part on the at least one additional component of the Z-score different from a sum and a mean initialized or derived for the pre-modified computation subset, at least one additional component of a Z-score different from a sum and a mean for the modified computation subset, wherein the decrementally deriving includes:
      accessing the at least one additional component of the Z-score different from a sum and a mean for the pre-modified computation subset without accessing all data elements in the modified computation subset thereby saving computing resources and reducing the computing-device-based computing system's power consumption; and
      removing any contribution of the data element removed from the pre-modified computation subset from each of the accessed components mathematically wherein not all data elements in the modified computation subset are used in the computation to reduce number of operations performed by the computing-device-based computing system thereby increasing calculation efficiency;

accessing, by the computing-device-based computing system, a data element selected for a Z-score calculation; and generating, by the computing-device-based computing system, a Z-score for the selected data element for the modified computation subset based on one or more of the decrementally derived components.

2. The computing-system-implemented method of claim 1, wherein the generating a Z-score further comprises indirectly decrementally deriving, by the computing-device-based computing system, one or more components of the Z-score for the modified computation subset, wherein the indirectly decrementally deriving the one or more components includes individually calculating each respective one of the one or more components based on one or more components other than the respective one component.

3. The computing-system-implemented method of claim 1, wherein the method further comprises accessing a data element selected for a Z-score calculation and determining, after initializing the at least one additional component of a Z-score, by the computing-device-based computing system and based on one or more of the initialized components, a Z-score for the selected data element for the pre-modified computation subset.

4. The computing-system-implemented method of claim 1, wherein the receiving a data element to be removed includes receiving a plurality of z ($z>1$) data elements to be removed from the pre-modified computation subset, and wherein the method further comprises performing, for each of the respective z data elements, the modifying the pre-modified computation subset, the decrementally deriving a sum or a mean or both, the directly decrementally deriving the at least one additional component of a Z-score different from a sum and a mean for the modified computation subset, the accessing a data element selected for a Z-score calculation, and the generating a Z-score for the selected data element for the modified computation sub set.

5. The computing-system-implemented method of claim 4, wherein the accessing a data element selected for a Z-score calculation and the generating a Z-score for the selected data element for the modified computation subset comprises accessing a data element selected for a Z-score calculation and generating a Z-score for the modified computation subset only when the Z-score is accessed.

6. The computing-system-implemented method of claim 5, wherein the generating a Z-score for the modified computation subset further comprises indirectly decrementally deriving, by the computing-device-based computing system, one or more components of the Z-score for the modified computation subset, wherein the indirectly decrementally deriving of the one or more components includes individually calculating each respective one of the one or more components based on one or more components other than the respective one component.

7. The computing-system-implemented method of claim 1, wherein the receiving a data element to be removed includes receiving a plurality of z data elements to be removed from the pre-modified computation subset, and wherein the method further comprises performing, for each of the respective z data elements, the modifying the pre-modified computation subset, the decrementally deriving a sum or a mean or both, and the directly decrementally deriving the at least one additional component of a Z-score different from a sum and a mean for the modified computation sub set.

8. The computing-system-implemented method of claim 1, wherein the accessing or receiving a data element to be removed from the pre-modified computation subset further comprises removing the accessed or received data element from a data buffer on at least one of the one or more storage media.

9. A computing system, the computing system comprising:
one or more computing devices;
each computing device comprising one or more processors;
one or more storage media; and
one or more calculation modules that, when executed by at least one of the one or more computing devices, determine a Z-score for a selected data element for a modified computation subset, the one or more calculation modules configured to:

a. initialize a computation subset size counter, a sum or a mean or both, and at least one additional component of a Z-score different from a sum and a mean for a pre-modified computation subset of a data stream or a data set on at least one of the one or more storage media, wherein the pre-modified computation subset contains a specified number, n ($n\geq6$), of data elements from the data stream or the data set, and the at least one additional component of a Z-score is a quantity or expression appearing in a Z-score's definition equation or any transforms of the equation;

b. access or receive a data element to be removed from the pre-modified computation subset;

c. modify the pre-modified computation subset by removing the accessed or received data element from the pre-modified computation subset and modifying the computation subset size counter;

d. decrementally calculate a sum or a mean or both for the modified computation sub set;

e. directly decrementally calculate at least one additional component of a Z-score different from a sum and a mean for the modified computation subset based at least in part on the at least one additional component of the Z-score different from a sum and a mean initialized or calculated for the pre-modified computation subset, wherein decremental calculation of the at least one additional component includes to remove any contribution of the removed data element from the at least one additional component of the Z-score different from a sum and a mean initialized or calculated for the pre-modified computation subset mathematically without accessing and using all data elements in the modified computation subset thereby reducing data access latency, reducing number of operations performed by the computing system, and reducing the computing system's power consumption;

f. access a data element selected for a Z-score calculation; and g. generate a Z-score for the selected data element for the modified computation subset based on one or more of the decrementally calculated components.

10. The computing system of claim 9, wherein the generating a Z-score for the modified computation subset further comprises indirectly decrementally calculate one or more components of a Z-score for the modified computation subset, wherein indirectly decrementally calculating one or more components includes individually calculating each respective one of the one or more components based on one or more components other than the respective one component.

11. The computing system of claim 9, wherein the one or more calculation modules, when executed by at least one of the one or more computing devices, performing b, c, d, e, f, and g multiple times.

12. The computing system of claim 11, wherein the performing f and g comprises accessing a data element selected for a Z-score calculation and generating a Z-score for the modified computation subset only when the Z-score is accessed.

13. The computing system of claim 12, wherein the generating a Z-score for the modified computation subset further comprises indirectly decrementally calculate one or more components of the Z-score for the modified computation subset, wherein indirectly decrementally calculating one or more components includes individually calculating each respective one of the one or more components based on one or more components other than the respective one component.

14. The computing system of claim 9, wherein the one or more calculation modules, when executed by at least one of the one or more computing devices, performing b, c, d, and e multiple times.

15. A computing system program product for use at a configured computing system which comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices in the configured computing system, cause the configured computing system to perform a method for generating a Z-score for a selected data element for a modified computation subset, the method including steps to:

initialize, by the configured computing system, a computation subset size counter, a sum or a mean or both, and at least one additional component of a Z-score different from a sum and a mean for a pre-modified computation subset of a data stream or a data set on at least one of the one or more storage media, wherein the pre-modified computation subset contains a specified number, n (n≥6), of data elements from the data stream or the data set, and the at least one additional component of a Z-score is a quantity or expression appearing in a Z-score's definition equation or any transforms of the equation;

access or receive, by the configured computing system, a data element to be removed from the pre-modified computation subset;

modify, by the configured computing system, the pre-modified computation subset via removing the accessed or received data element from the pre-modified computation subset and modifying the computation subset size counter by decreasing its value by 1;

decrementally calculate, by the configured computing system, a sum or a mean or both for the modified computation subset;

directly decrementally calculate, by the configured computing system, at least one additional component of a Z-score different from a sum and a mean for the modified computation subset based at least in part on the at least one additional component of the Z-score different from a sum and a mean initialized or calculated for the pre-modified computation subset, including to:

access the at least one additional component of the Z-score different from a sum and a mean for the pre-modified computation subset without accessing all data elements in the modified computation subset thereby saving computing resources and reducing the computing-device-based computing system's power consumption; and remove any contribution of the data element removed from the pre-modified computation subset from each of the accessed components mathematically wherein not all data elements in the modified computation subset are used in the computation to reduce number of operations performed by the computing-device-based computing system thereby increasing calculation efficiency;

access, by the configured computing system, a data element selected for a Z-score calculation; and generate, by the configured computing system, a Z-score for the selected data element for the modified computation subset based on one or more of the decrementally calculated components.

16. The computing system program product of claim 15, wherein the generating a Z-score further comprises indirectly decrementally calculating, by the configured computing system, one or more components of the Z-score for the modified computation subset, wherein indirectly decrementally calculating the one or more components includes individually calculating each respective one of the one or more components based on one or more components other than the respective one component.

17. The computing system program product of claim 15, wherein the computing-device-executable instructions that, when executed, further cause the configured computing system to access or receive a data element to be removed from the pre-modified computation subset, to modify the pre-modified computation subset and the computation subset size counter, to decrementally calculate a sum or a mean or both, to directly decrementally calculate the at least one additional component different from a sum and a mean, to access a data element selected for a Z-score calculation, and to generate a Z-score for the selected data element for the modified computation subset for each of multiple data elements to be removed from the pre-modified computation subset.

18. The computing system program product of claim 17, wherein the computing-device-executable instructions that, when executed, cause the configured computing system to access a data element selected for a Z-score calculation and generate a Z-score comprise computing-device-executable instructions that, when executed, cause the configured computing system to access a data element selected for a Z-score calculation and generate a Z-score for the modified computation subset only when the Z-score is accessed.

19. The computing system program product of claim 18, wherein the generating a Z-score for the modified computation subset further comprises indirectly decrementally calculate one or more components of the Z-score for the modified computation subset, wherein indirectly decrementally calculating one or more components includes individually calculating each respective one of the one or more components based on one or more components other than the respective one component.

20. The computing system program product of claim 15, wherein the computing-device-executable instructions that, when executed, further cause the configured computing system to access or receive a data element to be removed from the pre-modified computation subset, to modify the pre-modified computation subset and the computation subset size counter, to decrementally calculate a sum or a mean or both, and to directly decrementally calculate the at least one additional component different from a sum and a mean for each of multiple data elements to be removed from the pre-modified computation subset.

* * * * *